US010133588B1

(12) United States Patent
Moreland et al.

(10) Patent No.: US 10,133,588 B1
(45) Date of Patent: Nov. 20, 2018

(54) TRANSFORMING INSTRUCTIONS FOR COLLABORATIVE UPDATES

(71) Applicant: Palantir Technologies Inc., Palo Alto, CA (US)

(72) Inventors: Andrew Moreland, Stanford, CA (US); John Carrino, Redwood City, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/298,473

(22) Filed: Oct. 20, 2016

(51) Int. Cl.
*G06F 9/451* (2018.01)
*G06F 17/24* (2006.01)
*G06F 17/22* (2006.01)
*G06F 3/0482* (2013.01)
*G06F 3/0481* (2013.01)
*G06F 17/30* (2006.01)
*G06Q 10/10* (2012.01)

(52) U.S. Cl.
CPC ............ *G06F 9/451* (2018.02); *G06F 3/0481* (2013.01); *G06F 3/0482* (2013.01); *G06F 17/2211* (2013.01); *G06F 17/241* (2013.01); *G06F 17/30371* (2013.01); *G06Q 10/101* (2013.01)

(58) Field of Classification Search
None
See application file for complete search history.

(56) References Cited

U.S. PATENT DOCUMENTS

| 4,881,179 | A | 11/1989 | Vincent |
| 5,241,625 | A | 8/1993 | Epard |
| 5,724,575 | A | 3/1998 | Hoover et al. |
| 5,826,021 | A | 10/1998 | Masters et al. |
| 5,832,218 | A | 11/1998 | Gibbs et al. |
| 5,845,300 | A | 12/1998 | Comer et al. |
| 5,872,973 | A | 2/1999 | Mitchell |
| 5,878,434 | A | 3/1999 | Draper et al. |
| 5,897,636 | A | 4/1999 | Kaeser |
| 5,966,706 | A | 10/1999 | Biliris et al. |
| 5,999,911 | A | 12/1999 | Berg et al. |
| 6,006,242 | A | 12/1999 | Poole et al. |

(Continued)

FOREIGN PATENT DOCUMENTS

| AU | 2013251186 B2 | 11/2015 |
| AU | 2014206155 | 12/2015 |

(Continued)

OTHER PUBLICATIONS

"A Tour of Pinboard", [Online] Retrieved from the internet: <https://pinboard.in/tour/>, (May 15, 2014), 1-6.

(Continued)

*Primary Examiner* — Christopher J Fibbi
(74) *Attorney, Agent, or Firm* — Schwegman Lundberg & Woessner, P.A.

(57) ABSTRACT

In various example embodiments, a system and method for transforming instructions for collaborative updates are described herein. A group of instructions for an update of an element depicted in a client device version of a user interface are generated. The group of instructions is executed and the group or a subset of instructions are transmitted to a server. The server accepts or rejects the instructions. The server may execute the instructions to update a server version of the element. The server sends accepted instructions to the other or all client devices.

20 Claims, 10 Drawing Sheets

(56) References Cited

U.S. PATENT DOCUMENTS

| | | | |
|---|---|---|---|
| 6,057,757 A | 5/2000 | Arrowsmith et al. |
| 6,065,026 A | 5/2000 | Cornelia et al. |
| 6,073,129 A | 6/2000 | Levine et al. |
| 6,094,653 A | 7/2000 | Li et al. |
| 6,101,479 A | 8/2000 | Shaw |
| 6,134,582 A | 10/2000 | Kennedy |
| 6,161,098 A | 12/2000 | Wallman |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,279,018 B1 | 8/2001 | Kudrolli et al. |
| 6,304,873 B1 | 10/2001 | Klein et al. |
| 6,366,933 B1 | 4/2002 | Ball et al. |
| 6,370,538 B1 | 4/2002 | Lamping et al. |
| 6,418,438 B1 | 7/2002 | Campbell |
| 6,430,305 B1 | 8/2002 | Decker |
| 6,463,404 B1 | 10/2002 | Appleby |
| 6,510,504 B2 | 1/2003 | Satyanarayanan |
| 6,519,627 B1 | 2/2003 | Dan et al. |
| 6,523,019 B1 | 2/2003 | Borthwick |
| 6,549,752 B2 | 4/2003 | Tsukamoto |
| 6,560,620 B1 | 5/2003 | Ching |
| 6,574,635 B2 | 6/2003 | Stauber et al. |
| 6,642,945 B1 | 11/2003 | Sharpe |
| 6,665,683 B1 | 12/2003 | Meltzer |
| 6,745,382 B1 | 6/2004 | Zothner |
| 6,850,317 B2 | 2/2005 | Mullins et al. |
| 6,944,777 B1 | 9/2005 | Belani et al. |
| 6,944,821 B1 | 9/2005 | Bates et al. |
| 6,967,589 B1 | 11/2005 | Peters |
| 6,976,210 B1 | 12/2005 | Silva et al. |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,086,028 B1 | 8/2006 | Davis et al. |
| 7,111,231 B1 | 9/2006 | Huck et al. |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,403,942 B1 | 7/2008 | Bayliss |
| 7,441,182 B2 | 10/2008 | Beilinson et al. |
| 7,441,219 B2 | 10/2008 | Perry et al. |
| 7,461,158 B2 | 12/2008 | Rider et al. |
| 7,627,489 B2 | 12/2009 | Schaeffer et al. |
| 7,627,812 B2 | 12/2009 | Chamberlain et al. |
| 7,634,717 B2 | 12/2009 | Chamberlain et al. |
| 7,716,140 B1 | 5/2010 | Nielsen et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,739,246 B2 | 6/2010 | Mooney et al. |
| 7,757,220 B2 | 7/2010 | Griffith et al. |
| 7,761,407 B1 | 7/2010 | Stern |
| 7,765,489 B1 | 7/2010 | Shah et al. |
| 7,770,100 B2 | 8/2010 | Chamberlain et al. |
| 7,814,084 B2 | 10/2010 | Hallett et al. |
| 7,877,421 B2 | 1/2011 | Berger et al. |
| 7,880,921 B2 | 2/2011 | Dattilo et al. |
| 7,912,842 B1 | 3/2011 | Bayliss |
| 7,941,336 B1 | 5/2011 | Robin-Jan |
| 7,958,147 B1 | 6/2011 | Turner et al. |
| 7,962,495 B2 | 6/2011 | Jain et al. |
| 7,962,848 B2 | 6/2011 | Bertram |
| 7,966,199 B1 | 6/2011 | Frasher et al. |
| 7,984,374 B2 | 7/2011 | Caro et al. |
| 8,001,465 B2 | 8/2011 | Kudrolli et al. |
| 8,001,482 B2 | 8/2011 | Bhattiprolu et al. |
| 8,010,507 B2 | 8/2011 | Poston et al. |
| 8,041,714 B2 | 10/2011 | Aymeloglu et al. |
| 8,073,857 B2 | 12/2011 | Sreekanth |
| 8,108,779 B1 * | 1/2012 | Rein ................. G06F 17/30011 715/733 |
| 8,112,425 B2 | 2/2012 | Baum et al. |
| 8,117,022 B2 | 2/2012 | Linker |
| 8,126,848 B2 | 2/2012 | Wagner |
| 8,185,819 B2 | 5/2012 | Sah et al. |
| 8,191,005 B2 | 5/2012 | Baier et al. |
| 8,225,201 B2 | 7/2012 | Michael |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,312,367 B2 | 11/2012 | Foster |
| 8,352,870 B2 * | 1/2013 | Bailor .................... G06Q 10/10 715/230 |
| 8,364,642 B1 | 1/2013 | Garrod et al. |
| 8,386,377 B1 | 2/2013 | Xiong et al. |
| 8,392,556 B2 | 3/2013 | Goulet et al. |
| 8,417,715 B1 | 4/2013 | Bruckhaus |
| 8,429,527 B1 | 4/2013 | Arbogast |
| 8,504,542 B2 | 8/2013 | Chang et al. |
| 8,527,660 B2 * | 9/2013 | Prasad ................ H04L 67/1095 709/217 |
| 8,527,949 B1 | 9/2013 | Pleis et al. |
| 8,554,719 B2 | 10/2013 | Mcgrew et al. |
| 8,601,326 B1 | 12/2013 | Kirn |
| 8,620,641 B2 | 12/2013 | Farnsworth et al. |
| 8,639,552 B1 | 1/2014 | Chen et al. |
| 8,676,857 B1 | 3/2014 | Adams et al. |
| 8,682,696 B1 | 3/2014 | Shanmugam |
| 8,688,573 B1 | 4/2014 | Rukonic et al. |
| 8,732,574 B2 | 5/2014 | Burr et al. |
| 8,798,354 B1 | 8/2014 | Bunzel et al. |
| 8,799,313 B2 | 8/2014 | Satlow |
| 8,807,948 B2 | 8/2014 | Luo et al. |
| 8,812,444 B2 | 8/2014 | Garrod et al. |
| 8,838,538 B1 | 9/2014 | Landau et al. |
| 8,855,999 B1 | 10/2014 | Elliot |
| 8,903,717 B2 | 12/2014 | Elliot |
| 8,924,388 B2 | 12/2014 | Elliot et al. |
| 8,924,389 B2 | 12/2014 | Elliot et al. |
| 8,930,331 B2 | 1/2015 | McGrew et al. |
| 8,930,874 B2 | 1/2015 | Duff et al. |
| 8,938,434 B2 | 1/2015 | Jain et al. |
| 8,938,686 B1 | 1/2015 | Erenrich et al. |
| 8,954,410 B2 | 2/2015 | Chang et al. |
| 8,984,390 B2 | 3/2015 | Aymeloglu et al. |
| 9,009,827 B1 | 4/2015 | Albertson et al. |
| 9,043,696 B1 | 5/2015 | Meiklejohn et al. |
| 9,058,315 B2 | 6/2015 | Burr |
| 9,092,482 B2 | 7/2015 | Harris et al. |
| 9,105,000 B1 | 8/2015 | White et al. |
| 9,116,975 B2 | 8/2015 | Shankar et al. |
| 9,165,100 B2 | 10/2015 | Begur et al. |
| 9,208,159 B2 | 12/2015 | Stowe et al. |
| 9,230,060 B2 | 1/2016 | Friedlander |
| 9,230,280 B1 | 1/2016 | Maag et al. |
| 9,280,532 B2 | 3/2016 | Cicerone et al. |
| 9,286,373 B2 | 3/2016 | Elliot et al. |
| 9,348,499 B2 | 5/2016 | Aymeloglu et al. |
| 9,348,851 B2 | 5/2016 | Kim |
| 9,348,880 B1 | 5/2016 | Kramer et al. |
| 2001/0021936 A1 | 9/2001 | Bertram |
| 2001/0051949 A1 | 12/2001 | Carey et al. |
| 2001/0056522 A1 | 12/2001 | Satyanarayana |
| 2002/0032677 A1 | 3/2002 | Morgenthaler et al. |
| 2002/0035590 A1 | 3/2002 | Eibach et al. |
| 2002/0091694 A1 | 7/2002 | Hrle et al. |
| 2002/0095360 A1 | 7/2002 | Joao |
| 2002/0103705 A1 | 8/2002 | Brady |
| 2002/0194058 A1 | 12/2002 | Eldering |
| 2002/0196229 A1 | 12/2002 | Chen et al. |
| 2003/0028560 A1 | 2/2003 | Kudrolli et al. |
| 2003/0036927 A1 | 2/2003 | Bowen |
| 2003/0061132 A1 | 3/2003 | Mason, Sr. et al. |
| 2003/0074187 A1 | 4/2003 | Ait-Mokhtar et al. |
| 2003/0088438 A1 | 5/2003 | Maughan et al. |
| 2003/0093401 A1 | 5/2003 | Czajkowski et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0120675 A1 | 6/2003 | Stauber et al. |

(56) References Cited

U.S. PATENT DOCUMENTS

| | | |
|---|---|---|
| 2003/0126102 A1 | 7/2003 | Borthwick |
| 2003/0130993 A1 | 7/2003 | Mendelevitch et al. |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0078451 A1 | 4/2004 | Dietz et al. |
| 2004/0083466 A1 | 4/2004 | Dapp et al. |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2004/0153451 A1 | 8/2004 | Phillips et al. |
| 2004/0205492 A1 | 10/2004 | Newsome |
| 2004/0210763 A1 | 10/2004 | Jonas |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0091186 A1 | 4/2005 | Elish |
| 2005/0097441 A1 | 5/2005 | Herbach et al. |
| 2005/0102328 A1 | 5/2005 | Ring et al. |
| 2005/0108231 A1 | 5/2005 | Findleton et al. |
| 2005/0114763 A1 | 5/2005 | Nonomura et al. |
| 2005/0125715 A1 | 6/2005 | Di Franco et al. |
| 2005/0131935 A1 | 6/2005 | O'Leary et al. |
| 2005/0262493 A1 | 11/2005 | Schmidt et al. |
| 2005/0262512 A1 | 11/2005 | Schmidt et al. |
| 2005/0289524 A1 | 12/2005 | McGinnes |
| 2006/0010130 A1 | 1/2006 | Leff et al. |
| 2006/0026561 A1 | 2/2006 | Bauman et al. |
| 2006/0031779 A1 | 2/2006 | Theurer et al. |
| 2006/0045470 A1 | 3/2006 | Poslinski et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0074866 A1 | 4/2006 | Chamberlain et al. |
| 2006/0074881 A1 | 4/2006 | Vembu et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0095521 A1 | 5/2006 | Patinkin |
| 2006/0106847 A1 | 5/2006 | Eckardt, III et al. |
| 2006/0116991 A1 | 6/2006 | Calderwood |
| 2006/0129746 A1 | 6/2006 | Porter |
| 2006/0136513 A1 | 6/2006 | Ngo et al. |
| 2006/0143075 A1 | 6/2006 | Carr et al. |
| 2006/0155654 A1 | 7/2006 | Plessis et al. |
| 2006/0161558 A1 | 7/2006 | Tamma et al. |
| 2006/0178915 A1 | 8/2006 | Chao |
| 2006/0178954 A1 | 8/2006 | Thukral et al. |
| 2006/0200755 A1* | 9/2006 | Melmon ............ H04L 67/1095 715/234 |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0018986 A1 | 1/2007 | Hauser |
| 2007/0043686 A1 | 2/2007 | Teng et al. |
| 2007/0050429 A1 | 3/2007 | Goldring et al. |
| 2007/0061487 A1 | 3/2007 | Moore et al. |
| 2007/0061752 A1 | 3/2007 | Cory |
| 2007/0067285 A1 | 3/2007 | Blume et al. |
| 2007/0113164 A1 | 5/2007 | Hansen et al. |
| 2007/0136095 A1 | 6/2007 | Weinstein |
| 2007/0143253 A1 | 6/2007 | Kostamaa et al. |
| 2007/0162454 A1 | 7/2007 | D' Albora et al. |
| 2007/0168871 A1 | 7/2007 | Jenkins |
| 2007/0174760 A1 | 7/2007 | Chamberlain et al. |
| 2007/0178501 A1 | 8/2007 | Rabinowitz et al. |
| 2007/0185850 A1 | 8/2007 | Walters et al. |
| 2007/0192122 A1 | 8/2007 | Routson et al. |
| 2007/0233756 A1 | 10/2007 | D'Souza et al. |
| 2007/0245339 A1 | 10/2007 | Bauman et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds et al. |
| 2008/0015970 A1 | 1/2008 | Brookfield et al. |
| 2008/0016155 A1 | 1/2008 | Khalatian |
| 2008/0091693 A1 | 4/2008 | Murthy |
| 2008/0104060 A1 | 5/2008 | Abhyankar et al. |
| 2008/0104149 A1 | 5/2008 | Vishniac et al. |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195672 A1 | 8/2008 | Hamel et al. |
| 2008/0201339 A1 | 8/2008 | McGrew et al. |
| 2008/0208735 A1 | 8/2008 | Balet et al. |
| 2008/0215546 A1 | 9/2008 | Baum et al. |
| 2008/0228467 A1 | 9/2008 | Womack et al. |
| 2008/0249820 A1 | 10/2008 | Pathria et al. |
| 2008/0267386 A1 | 10/2008 | Cooper |
| 2008/0270316 A1 | 10/2008 | Guidotti et al. |
| 2008/0276167 A1 | 11/2008 | Michael |
| 2008/0281580 A1 | 11/2008 | Zabokritski |
| 2008/0288475 A1 | 11/2008 | Kim et al. |
| 2008/0301042 A1 | 12/2008 | Patzer |
| 2008/0301378 A1 | 12/2008 | Carrie |
| 2008/0313132 A1 | 12/2008 | Hao et al. |
| 2008/0313243 A1 | 12/2008 | Poston et al. |
| 2009/0024962 A1 | 1/2009 | Gotz |
| 2009/0031247 A1 | 1/2009 | Walter et al. |
| 2009/0031401 A1 | 1/2009 | Cudich et al. |
| 2009/0037417 A1 | 2/2009 | Shankar et al. |
| 2009/0043801 A1 | 2/2009 | LeClair et al. |
| 2009/0055487 A1 | 2/2009 | Moraes et al. |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0106242 A1 | 4/2009 | McGrew et al. |
| 2009/0106308 A1 | 4/2009 | Killian et al. |
| 2009/0112678 A1 | 4/2009 | Luzardo |
| 2009/0112745 A1 | 4/2009 | Stefanescu |
| 2009/0150868 A1 | 6/2009 | Chakra et al. |
| 2009/0157732 A1 | 6/2009 | Hao et al. |
| 2009/0164387 A1 | 6/2009 | Armstrong et al. |
| 2009/0164934 A1 | 6/2009 | Bhattiprolu et al. |
| 2009/0172669 A1 | 7/2009 | Bobak et al. |
| 2009/0177962 A1 | 7/2009 | Gusmorino et al. |
| 2009/0187546 A1 | 7/2009 | Whyte |
| 2009/0199106 A1 | 8/2009 | Jonsson et al. |
| 2009/0216562 A1 | 8/2009 | Faulkner et al. |
| 2009/0228365 A1 | 9/2009 | Tomchek et al. |
| 2009/0228507 A1 | 9/2009 | Jain et al. |
| 2009/0240664 A1 | 9/2009 | Dinker et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254971 A1 | 10/2009 | Herz et al. |
| 2009/0271343 A1 | 10/2009 | Vaiciulis et al. |
| 2009/0271435 A1 | 10/2009 | Yako et al. |
| 2009/0281839 A1 | 11/2009 | Lynn et al. |
| 2009/0282068 A1 | 11/2009 | Shockro et al. |
| 2009/0287470 A1 | 11/2009 | Farnsworth et al. |
| 2009/0299830 A1 | 12/2009 | West et al. |
| 2009/0307049 A1 | 12/2009 | Elliott, Jr. et al. |
| 2009/0313223 A1 | 12/2009 | Rantanen et al. |
| 2009/0313311 A1 | 12/2009 | Hoffmann et al. |

(56) References Cited

U.S. PATENT DOCUMENTS

| | | |
|---|---|---|
| 2009/0313463 A1 | 12/2009 | Pang et al. |
| 2009/0319515 A1 | 12/2009 | Minton et al. |
| 2009/0319891 A1 | 12/2009 | MacKinlay et al. |
| 2010/0004857 A1 | 1/2010 | Pereira et al. |
| 2010/0036831 A1 | 2/2010 | Vemuri et al. |
| 2010/0057622 A1 | 3/2010 | Faith |
| 2010/0070489 A1 | 3/2010 | Aymeloglu et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0076813 A1 | 3/2010 | Ghosh et al. |
| 2010/0076939 A1 | 3/2010 | Iwaki et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0122152 A1 | 5/2010 | Chamberlain et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0204983 A1 | 8/2010 | Chung et al. |
| 2010/0211550 A1 | 8/2010 | Daniello et al. |
| 2010/0211618 A1 | 8/2010 | Anderson et al. |
| 2010/0223260 A1 | 9/2010 | Wu |
| 2010/0235606 A1 | 9/2010 | Oreland et al. |
| 2010/0238174 A1 | 9/2010 | Haub et al. |
| 2010/0262901 A1 | 10/2010 | DiSalvo |
| 2010/0280851 A1 | 11/2010 | Merkin |
| 2010/0283787 A1 | 11/2010 | Hamedi et al. |
| 2010/0306285 A1 | 12/2010 | Shah et al. |
| 2010/0306722 A1 | 12/2010 | Lehoty et al. |
| 2010/0313239 A1 | 12/2010 | Chakra et al. |
| 2010/0318838 A1 | 12/2010 | Katano et al. |
| 2010/0325581 A1 | 12/2010 | Finkelstein et al. |
| 2011/0004626 A1 | 1/2011 | Naeymi-rad et al. |
| 2011/0029498 A1 | 2/2011 | Ferguson et al. |
| 2011/0047540 A1 | 2/2011 | Williams et al. |
| 2011/0066497 A1 | 3/2011 | Gopinath et al. |
| 2011/0074788 A1 | 3/2011 | Regan et al. |
| 2011/0093327 A1 | 4/2011 | Fordyce, III et al. |
| 2011/0099133 A1 | 4/2011 | Chang et al. |
| 2011/0107196 A1 | 5/2011 | Foster |
| 2011/0153592 A1 | 6/2011 | DeMarcken |
| 2011/0161132 A1 | 6/2011 | Goel et al. |
| 2011/0161409 A1 | 6/2011 | Nair et al. |
| 2011/0173093 A1 | 7/2011 | Psota et al. |
| 2011/0173619 A1 | 7/2011 | Fish |
| 2011/0179048 A1 | 7/2011 | Satlow |
| 2011/0184813 A1 | 7/2011 | Barnes et al. |
| 2011/0208565 A1 | 8/2011 | Ross et al. |
| 2011/0208822 A1 | 8/2011 | Rathod |
| 2011/0225482 A1 | 9/2011 | Chan et al. |
| 2011/0225586 A1 | 9/2011 | Bentley et al. |
| 2011/0252282 A1 | 10/2011 | Meek et al. |
| 2011/0258158 A1 | 10/2011 | Resende, Jr. et al. |
| 2011/0258216 A1 | 10/2011 | Supakkul |
| 2011/0258242 A1 | 10/2011 | Eidson et al. |
| 2011/0270812 A1 | 11/2011 | Ruby |
| 2012/0004894 A1 | 1/2012 | Butler et al. |
| 2012/0022945 A1 | 1/2012 | Falkenborg et al. |
| 2012/0059853 A1 | 3/2012 | Jagota |
| 2012/0065987 A1 | 3/2012 | Farooq et al. |
| 2012/0072825 A1 | 3/2012 | Sherkin et al. |
| 2012/0078595 A1 | 3/2012 | Balandin et al. |
| 2012/0084117 A1 | 4/2012 | Tavares et al. |
| 2012/0084184 A1 | 4/2012 | Raleigh et al. |
| 2012/0084287 A1 | 4/2012 | Lakshminarayan et al. |
| 2012/0089606 A1 | 4/2012 | Eshwar et al. |
| 2012/0123989 A1 | 5/2012 | Yu et al. |
| 2012/0124179 A1 | 5/2012 | Cappio et al. |
| 2012/0136804 A1 | 5/2012 | Lucia et al. |
| 2012/0150791 A1 | 6/2012 | Willson |
| 2012/0159307 A1 | 6/2012 | Chung et al. |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovich |
| 2012/0215784 A1 | 8/2012 | King et al. |
| 2012/0226590 A1 | 9/2012 | Love et al. |
| 2012/0266245 A1 | 10/2012 | McDougal et al. |
| 2012/0284670 A1 | 11/2012 | Kashik et al. |
| 2012/0304244 A1 | 11/2012 | Xie et al. |
| 2012/0323829 A1 | 12/2012 | Stokes |
| 2012/0330908 A1 | 12/2012 | Stowe et al. |
| 2013/0006947 A1 | 1/2013 | Akinyemi et al. |
| 2013/0016106 A1 | 1/2013 | Yip et al. |
| 2013/0036346 A1 | 2/2013 | Cicerone |
| 2013/0055264 A1 | 2/2013 | Burr et al. |
| 2013/0060742 A1 | 3/2013 | Chang et al. |
| 2013/0096968 A1 | 4/2013 | Van Pelt et al. |
| 2013/0097130 A1 | 4/2013 | Bingol et al. |
| 2013/0097482 A1 | 4/2013 | Marantz et al. |
| 2013/0124193 A1 | 5/2013 | Holmberg |
| 2013/0124567 A1 | 5/2013 | Balinsky et al. |
| 2013/0132348 A1 | 5/2013 | Garrod et al. |
| 2013/0151305 A1 | 6/2013 | Akinola et al. |
| 2013/0151388 A1 | 6/2013 | Falkenborg et al. |
| 2013/0151453 A1 | 6/2013 | Bhanot et al. |
| 2013/0166480 A1 | 6/2013 | Popescu et al. |
| 2013/0226879 A1 | 8/2013 | Talukder et al. |
| 2013/0226944 A1 | 8/2013 | Baid et al. |
| 2013/0246316 A1 | 9/2013 | Zhao et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0288719 A1 | 10/2013 | Alonzo |
| 2013/0304770 A1 | 11/2013 | Boero et al. |
| 2013/0318060 A1 | 11/2013 | Chang et al. |
| 2013/0325826 A1 | 12/2013 | Agarwal et al. |
| 2014/0006404 A1 | 1/2014 | Mcgrew et al. |
| 2014/0089339 A1 | 3/2014 | Siddiqui et al. |
| 2014/0095363 A1 | 4/2014 | Caldwell |
| 2014/0108074 A1 | 4/2014 | Miller et al. |
| 2014/0129936 A1 | 5/2014 | Richards et al. |
| 2014/0149272 A1 | 5/2014 | Hirani et al. |
| 2014/0181833 A1 | 6/2014 | Bird et al. |
| 2014/0208281 A1 | 7/2014 | Ming |
| 2014/0222793 A1 | 8/2014 | Sadkin et al. |
| 2014/0244284 A1 | 8/2014 | Smith |
| 2014/0324876 A1 | 10/2014 | Konik et al. |
| 2014/0344231 A1 | 11/2014 | Stowe et al. |
| 2014/0358829 A1 | 12/2014 | Hurwitz |
| 2015/0012509 A1 | 1/2015 | Kirn |
| 2015/0026622 A1 | 1/2015 | Roaldson |
| 2015/0039886 A1 | 2/2015 | Kajol et al. |
| 2015/0046481 A1 | 2/2015 | Elliot |
| 2015/0073954 A1 | 3/2015 | Braff |
| 2015/0089353 A1 | 3/2015 | Folkening |
| 2015/0100907 A1 | 4/2015 | Erenrich et al. |
| 2015/0106347 A1 | 4/2015 | McGrew et al. |
| 2015/0106379 A1 | 4/2015 | Elliot et al. |
| 2015/0112956 A1 | 4/2015 | Chang et al. |
| 2015/0186483 A1 | 7/2015 | Tappan et al. |
| 2015/0195311 A1* | 7/2015 | Lemonik .............. H04L 65/403 715/753 |
| 2015/0199328 A1* | 7/2015 | Danziger .............. G06F 17/246 715/219 |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0254220 A1 | 9/2015 | Burr et al. |
| 2015/0261817 A1 | 9/2015 | Harris et al. |
| 2015/0341467 A1 | 11/2015 | Lim et al. |
| 2016/0034545 A1 | 2/2016 | Shankar et al. |
| 2016/0062555 A1 | 3/2016 | Ward et al. |
| 2016/0098176 A1 | 4/2016 | Cervelli et al. |

(56) References Cited

U.S. PATENT DOCUMENTS

| | | |
|---|---|---|
| 2016/0110369 A1 | 4/2016 | Cervelli et al. |
| 2016/0147730 A1 | 5/2016 | Cicerone |
| 2016/0162519 A1 | 6/2016 | Stowe et al. |

FOREIGN PATENT DOCUMENTS

| | | |
|---|---|---|
| AU | 2014203669 | 5/2016 |
| CN | 102054015 B | 5/2014 |
| DE | 102014204827 A1 | 9/2014 |
| DE | 102014204830 A1 | 9/2014 |
| DE | 102014204834 A1 | 9/2014 |
| DE | 102014213036 A1 | 1/2015 |
| EP | 0652513 A1 | 5/1995 |
| EP | 1672527 A2 | 6/2006 |
| EP | 2487610 A2 | 8/2012 |
| EP | 2555126 A2 | 2/2013 |
| EP | 2778913 A1 | 9/2014 |
| EP | 2778914 A1 | 9/2014 |
| EP | 2863326 A1 | 4/2015 |
| EP | 2891992 A1 | 7/2015 |
| EP | 2993595 A1 | 3/2016 |
| EP | 3002691 A1 | 4/2016 |
| EP | 3009943 A1 | 4/2016 |
| EP | 3032441 A2 | 6/2016 |
| EP | 3035214 A1 | 6/2016 |
| GB | 2366498 A | 3/2002 |
| GB | 2513472 A | 10/2014 |
| GB | 2513721 A | 11/2014 |
| GB | 2517582 A | 2/2015 |
| NL | 2013134 A | 1/2015 |
| WO | WO-01025906 A1 | 4/2001 |
| WO | WO-2001088750 A1 | 11/2001 |
| WO | WO-2007133206 A1 | 11/2007 |
| WO | WO-2009051987 A1 | 4/2009 |
| WO | WO-2010030913 A2 | 3/2010 |
| WO | WO-2010030914 A2 | 3/2010 |
| WO | WO-2010030919 A2 | 3/2010 |
| WO | WO-2012025915 A1 | 3/2012 |
| WO | WO-2012061162 A1 | 5/2012 |
| WO | WO-2012119008 A2 | 9/2012 |

OTHER PUBLICATIONS

"Apache Cassandra", Webpage; The Apache Software Foundation, (2009), 1-3.

"Apache HBase", Webpage; Apache HBase Overview poage (Sep. 9, 2011), 1.

"U.S. Appl. No. 12/556,307, Final Office Action dated Feb. 13, 2012", 27 pgs.

"U.S. Appl. No. 12/556,307, Final Office Action dated Mar. 14, 2014", 27 pgs.

"U.S. Appl. No. 12/556,307, Non Final Office Action dated Jun. 9, 2015", 33 pgs.

"U.S. Appl. No. 12/556,307, Non Final Office Action dated Sep. 2, 2011", 23 pgs.

"U.S. Appl. No. 12/556,307, Non Final Office Action dated Oct. 1, 2013", 24 pgs.

"U.S. Appl. No. 12/556,307, Notice of Allowance dated Jan. 4, 2016", 8 pgs.

"U.S. Appl. No. 12/556,307, Notice of Allowance dated Mar. 21, 2016", 11 pgs.

"U.S. Appl. No. 12/556,318, Notice of Allowance dated Apr. 11, 2016", 65 pgs.

"U.S. Appl. No. 12/556,321, Final Office Action dated Feb. 25, 2016", 26 pgs.

"U.S. Appl. No. 12/556,321, Final Office Action dated Jun. 6, 2012", 27 pgs.

"U.S. Appl. No. 12/556,321, Non Final Office Action dated Jul. 7, 2015", 18 pgs.

"U.S. Appl. No. 12/556,321, Non Final Office Action dated Dec. 7, 2011", 18 pgs.

"U.S. Appl. No. 13/196,788, Examiner Interview Summary dated Nov. 25, 2015", 7 pgs.

"U.S. Appl. No. 13/196,788, Non Final Office Action dated Oct. 23, 2015", 20 pgs.

"U.S. Appl. No. 13/196,788, Notice of Allowance dated Dec. 18, 2015", 17 pgs.

"U.S. Appl. No. 13/669,274, Advisory Action dated Aug. 26, 2015", 7 pgs.

"U.S. Appl. No. 13/669,274, Final Office Action dated May 6, 2015", 12 pgs.

"U.S. Appl. No. 13/669,274, Non Final Office Action dated May 2, 2016", 25 pgs.

"U.S. Appl. No. 13/826,228, Notice of Allowance dated Mar. 27, 2015", 10 pgs.

"U.S. Appl. No. 13/827,491, Final Office Action dated Jun. 22, 2015", 28 pgs.

"U.S. Appl. No. 13/827,491, Non Final Office Action dated Mar. 30, 2016", 25 pgs.

"U.S. Appl. No. 13/827,491, Non Final Office Action dated Oct. 9, 2015", 16 pgs.

"U.S. Appl. No. 13/827,491, Non Final Office Action dated Dec. 1, 2014", 5 pgs.

"U.S. Appl. No. 14/014,313, Final Office Action dated Feb. 26, 2016", 16 pgs.

"U.S. Appl. No. 14/014,313, First Action Interview Pre-Interview Communication dated Jun. 18, 2015", 4 pgs.

"U.S. Appl. No. 14/094,418, Notice of Allowance dated Jan. 25, 2016", 22 pgs.

"U.S. Appl. No. 14/102,394, Office Action dated Mar. 27, 2014", 16 pgs.

"U.S. Appl. No. 14/108,187, Applicant-Initiated Interview Summary dated Apr. 17, 2014", 8 pgs.

"U.S. Appl. No. 14/108,187, First Action Interview dated Mar. 20, 2014", 7 pgs.

"U.S. Appl. No. 14/135,289, First Action Interview Office Action Summary dated Jul. 7, 2014", 12 pgs.

"U.S. Appl. No. 14/135,289, First Action Interview Pilot Program Pre-Interview Communication dated Apr. 16, 2014", 8 pgs.

"U.S. Appl. No. 14/192,767, Corrected Notice of Allowability dated Apr. 20, 2015", 6 pgs.

"U.S. Appl. No. 14/192,767, First Action Interview Office Action Summary dated Sep. 24, 2014", 8 pgs.

"U.S. Appl. No. 14/192,767, First Action Interview Pilot Program Pre-Interview Communication dated May 6, 2014", 23 pgs.

"U.S. Appl. No. 14/192,767, Notice of Allowance dated Dec. 16, 2014", 9 pgs.

"U.S. Appl. No. 14/196,814, First Action Interview Office Action Summary dated Sep. 13, 2014", 8 pgs.

"U.S. Appl. No. 14/222,364, Non Final Office Action dated Dec. 9, 2015", 38 pgs.

"U.S. Appl. No. 14/225,006, Final Office Action dated Sep. 2, 2015", 28 pgs.

"U.S. Appl. No. 14/265,637, First Action Interview Pre-Interview Communication dated Sep. 26, 2014", 6 pgs.

"U.S. Appl. No. 14/265,637, Notice of Allowance dated Feb. 13, 2015", 11 pgs.

"U.S. Appl. No. 14/268,964, Non- Final Office Action dated Jul. 11, 2014", 10 pgs.

"U.S. Appl. No. 14/278,963, Final Office Action dated Jan. 30, 2015", 6 pgs.

"U.S. Appl. No. 14/278,963, Notice of Allowance dated Sep. 2, 2015", 6 pgs.

"U.S. Appl. No. 14/289,596, Final Office Action dated Aug. 5, 2015", 15 pgs.

"U.S. Appl. No. 14/304,741, Final Office Action dated Mar. 3, 2015", 24 pgs.

"U.S. Appl. No. 14/304,741, Notice of Allowance dated Apr. 7, 2015", 22 pgs.

"U.S. Appl. No. 14/304,741, Pre-Interview Communication dated Aug. 6, 2014", 13 pgs.

"U.S. Appl. No. 14/332,306, First Action Interview Pre-Interview Communication dated May 20, 2016", 5 pgs.

(56) References Cited

OTHER PUBLICATIONS

"U.S. Appl. No. 14/451,221, Ex Parte Quayle Action dated Apr. 6, 2015", 4 pgs.
"U.S. Appl. No. 14/451,221, Notice of Allowance dated Aug. 4, 2015", 15 pgs.
"U.S. Appl. No. 14/473,860, First Action Interview dated Nov. 4, 2014", 23 pgs.
"U.S. Appl. No. 14/479,160, First Action Interview Pre-Interview Communication dated Apr. 20, 2016", 7 pgs.
"U.S. Appl. No. 14/504,103, First Action Interview Pre-Interview Communication dated Feb. 5, 2015", 22 pgs.
"U.S. Appl. No. 14/504,103, First Action Interview Pre-Interview Communication dated Mar. 31, 2015", 9 pgs.
"U.S. Appl. No. 14/504,103, Notice of Allowance dated Mar. 18, 2015", 18 pgs.
"U.S. Appl. No. 14/526,066, Final Office Action dated May 6, 2016", 16 pgs.
"U.S. Appl. No. 14/526,066, Non Final Office Action dated Jan. 21, 2016", 24 pgs.
"U.S. Appl. No. 14/552,336, First Action Interview Pre-Interview Communication dated Jul. 20, 2015", 18 pgs.
"U.S. Appl. No. 14/552,336, Notice of Allowance dated Nov. 3, 2015", 13 pgs.
"U.S. Appl. No. 14/571,098, Final Office Action dated Feb. 23, 2016", 37 pgs.
"U.S. Appl. No. 14/571,098, First Action Interview dated Aug. 24, 2015", 4 pgs.
"U.S. Appl. No. 14/571,098, First Action Interview Pre-Interview Communication dated Mar. 11, 2015", 4 pgs.
"U.S. Appl. No. 14/571,098, First Action Interview Pre-Interview Communication dated Aug. 5, 2015", 4 pgs.
"U.S. Appl. No. 14/571,098, First Action Interview Pre-Interview Communication dated Nov. 10, 2015", 5 pgs.
"U.S. Appl. No. 14/578,389, Non Final Office Action dated Apr. 22, 2016", 9 pgs.
"U.S. Appl. No. 14/578,389, Non Final Office Action dated Oct. 21, 2015", 17 pgs.
"U.S. Appl. No. 14/580,218, Non Final Office Action dated Jun. 7, 2016", 16 pgs.
"U.S. Appl. No. 14/580,218, Non Final Office Action dated Jun. 26, 2015", 22 pgs.
"U.S. Appl. No. 14/676,621, Notice of Allowance dated Feb. 10, 2016", 5 pgs.
"U.S. Appl. No. 14/715,834, Final Office Action dated Jun. 28, 2016", 13 pgs.
"U.S. Appl. No. 14/715,834, First Action Interview Pre-Interview Communication dated Feb. 19, 2016", 19 pgs.
"U.S. Appl. No. 14/715,834, First Action Interview Pre-Interview Communication dated Apr. 13, 2016", 21 pgs.
"U.S. Appl. No. 14/726,211, Non Final Office Action dated Apr. 5, 2016", 15 pgs.
"U.S. Appl. No. 14/734,772, First Action Interview Pre-Interview Communication Jul. 24, 2015", 12 pgs.
"U.S. Appl. No. 14/734,772, First Action Interview Pre-Interview Communication dated Oct. 30, 2015", 14 pgs.
"U.S. Appl. No. 14/734,772, Notice of Allowance dated Apr. 27, 2016", 18 pgs.
"U.S. Appl. No. 14/741,256, Restriction Requirement dated Feb. 9, 2016", 6 pgs.
"U.S. Appl. No. 14/746,671, First Action Interview Pre-Interview Communication dated Sep. 28, 2015", 5 pgs.
"U.S. Appl. No. 14/746,671, First Action Interview Pre-Interview Communication dated Nov. 12, 2015", 19 pgs.
"U.S. Appl. No. 14/746,671, Notice of Allowance dated Jan. 21, 2016", 7 pgs.
"U.S. Appl. No. 14/800,447, Examiner Interview Summary dated Mar. 3, 2016", 28 pgs.
"U.S. Appl. No. 14/800,447, Final Office Action dated Sep. 6, 2016", 27 pgs.
"U.S. Appl. No. 14/800,447, First Action Interview Pre-Interview Communication dated Dec. 12, 2015", 26 pgs.
"U.S. Appl. No. 14/841,338, Non Final Office Action dated Feb. 18, 2016", 39 pgs.
"U.S. Appl. No. 14/842,734, First Action Interview Pre-Interview Communication dated Nov. 19, 2015", 17 pgs.
"U.S. Appl. No. 14/849,454, Notice of Allowance dated May 25, 2016", 26 pgs.
"U.S. Appl. No. 14/871,465, First Action Interview Pre-Interview Communication dated Feb. 9, 2016", 32 pgs.
"U.S. Appl. No. 14/871,465, First Action Interview Pre-Interview Communication dated Apr. 11, 2016", 7 pgs.
"U.S. Appl. No. 14/883,498, First Action Interview Pre-Interview Communication dated Dec. 24, 2015", 33 pgs.
"U.S. Appl. No. 14/883,498, Non Final Office Action dated Mar. 17, 2016", 18 pgs.
"U.S. Appl. No. 14/961,481, Notice of Allowance dated May 2, 2016", 6 pgs.
"U.S. Appl. No. 14/961,481, Pre-Interview Communication dated Mar. 2, 2016", 12 pgs.
"U.S. Appl. No. 14/961,830, Non Final Office Action dated May 20, 2016", 28 pgs.
"U.S. Appl. No. 14/975,215, First Action Interview Pre-Interview Communication dated May 19, 2016", 5 pgs.
"U.S. Appl. No. 14/996,179, First Action Interview Pre-Interview Communication dated May 20, 2016", 4 pgs.
"Australian Application Serial No. 2013251186, Notice of Acceptance dated Nov. 6, 2015", 2 pgs.
"Australian Application Serial No. 2013251186, Office Action dated Mar. 12, 2015", 3 pgs.
"Australian Application Serial No. 2014201506, Office Action dated Feb. 27, 2015", 3 pgs.
"Australian Application Serial No. 2014201507, Office Action dated Feb. 27, 2015", 2 pgs.
"Australian Application Serial No. 2014203669, Notice of Acceptance dated Jan. 21, 2016", 2 pgs.
"Australian Application Serial No. 2014203669, Office Action dated May 29, 2015", 2 pgs.
"BackTult—JD Edwards One World Version Control System", eKin Systems, Inc., 1.
"Canadian Application Serial No. 2,831,660, Office Action dated Jun. 9, 2015", 4 pgs.
"Clip2Net—Share files, folders and screenshots easily", Online Tech Tips, [Online]. Retrieved from the Internet: <URL: http://www.online-tech-tips.com/free-software-downloads/share-files-folders-screenshots/>, (Apr. 2, 2008), 5 pgs.
"Delicious", [Online]. Retrieved from the Internet: <URL: http://delicious.com/>, (accessed May 15, 2014), 1 pg.
"E-MailRelay", Internet Archive Wayback Machine [Online]. Retrieved from the Internet: <URL: http://emailrelay.sourceforge.net/, (accessed Aug. 21, 2008), 2 pgs.
"Entity Resolution—A Real-World Problem of Matching Records", Techniques: Minhashing, Locality-Sensitive Hashing Measuring the Quality of the Results, [Online] retrieved from the internet: <http://grupoweb.upf.es/bd-web/slides/ullman.pdf>, (Nov. 2006), 1-16.
"European Application Serial No. 15190307.7, Extended Search Report dated Feb. 19, 2016", 8 pgs.
"European Application Serial No. 09812700.3, Extended European Search Report dated Apr. 3, 2014", 9 pgs.
"European Application Serial No. 10188239.7, Non Final Office Action dated Apr. 24, 2016", 6 pgs.
"European Application Serial No. 12181585.6, Communication pursuant to Article 94(3) EPC dated Sep. 4, 2015", 9 pgs.
"European Application Serial No. 14158958.0, Communication Pursuant to Article 94(3) EPC dated Mar. 11, 2016", 5 pgs.
"European Application Serial No. 14158958.0, Communication Pursuant to Article 94(3) EPC dated Apr. 16, 2015", 9 pgs.
"European Application Serial No. 14158958.0, Extended European Search Report dated Jun. 3, 2014", 11 pgs.
"European Application Serial No. 14158977.0, Communication Pursuant to Article 94(3) EPC dated Mar. 11, 2016", 5 pgs.
"European Application Serial No. 14158977.0, Communication Pursuant to Article 94(3) EPC dated Apr. 16, 2015", 8 pgs.

(56) References Cited

OTHER PUBLICATIONS

"European Application Serial No. 14158977.0, Extended European Search Report dated Jun. 10, 2014", 10 pgs.
"European Application Serial No. 14189344.6, Extended European Search Report dated Feb. 20, 2015", 8 pgs.
"European Application Serial No. 14189344.6, Non Final Office Action dated Feb. 29, 2016", 9 pgs.
"European Application U.S. Appl. No. 14199182.8, Extended European Search Report dated Mar. 13, 2015", 8 pgs.
"European Application Serial No. 15183721.8, Extended European Search Report dated Nov. 23, 2015", 8 pgs.
"European Application Serial No. 15188106.7, Extended European Search Report dated Feb. 3, 2016", 8 pgs.
"European Application Serial No. 15200073.3, Extended European Search Report dated Mar. 30, 2016", 16 pgs.
"Federated Database System", From Wikipedia, (Sep. 7, 2013), 1-6.
"GrabUp—What a Timesaver!", [Online]. Retrieved from the Internet: <URL http://atlchris.com/191/grabup/>, (Aug. 11, 2008), 10 pgs.
"Great Britain Application Serial No. 1404486.1, Combined Search Report and Examination Report dated Aug. 27, 2014", 5 pgs.
"Great Britain Application Serial No. 1404486.1, Office Action dated May 21, 2015", 2 pgs.
"Great Britain Application Serial No. 1404489.5, Combined Search Report and Examination Report dated Aug. 27, 2014", 5 pgs.
"Great Britain Application Serial No. 1404489.5, Office Action dated May 21, 2015", 3 pgs.
"Great Britain Application Serial No. 1404499.4, Combined Search Report and Examination Report dated Aug. 20, 2014", 6 pgs.
"Great Britain Application Serial No. 1404499.4, Office Action dated Jun. 11, 2015", 5 pgs.
"Great Britain Application Serial No. 1411984.6, Office Action dated Jan. 8, 2016", 8 pgs.
"Great Britain Application Serial No. 1411984.6, Office Action dated Dec. 22, 2014", 6 pgs.
"Kwout", [Online]. Retrieved from the Internet: <URL: http://web.archive.org/web/20080905132448/http://www.kwout.com/>, (Sep. 5, 2008), 2 pgs.
"Microsoft CRM duplicate detection", Pythagoras—1 pg, [Online]. Retrieved from the Internet: <URL: https://www.youtube.com/watch?v=j-7Qis0D0Kc>, (Uploaded: Sep. 13, 2011), Time: 5:09.
"Microsoft Windows Version 2002 Print Out 2", Microsoft Windows, (2002), 6 pgs.
"Multimap", Wikipedia, [Online]. Retrieved from the Internet: <URL: https://en.wikipedia.org/w/index.php?title=Multimap&oldid=530800748>, (Jan. 1, 2013), 2 pgs.
"Netherlands Application Serial No. 2011729, Search Report dated Aug. 13, 2015", 8 pgs.
"Netherlands Application Serial No. 2012417, Netherlands Search Report dated Sep. 18, 2015", W/ English Translation, 9 pgs.
"Netherlands Application Serial No. 2012421, Netherlands Search Report dated Sep. 18, 2015", 8 pgs.
"Netherlands Application Serial No. 2012436, Search Report dated Nov. 6, 2015", w/ English Translation, 8 pgs.
"Netherlands Application Serial No. 2012438, Search Report dated Sep. 21, 2015", 8 pgs.
"Netherlands Application Serial No. 2013134, Netherlands Search Report dated Apr. 20, 2015", 6 pgs.
"New Zealand Application Serial No. 622404, Office Action dated Mar. 20, 2014", 2 pgs.
"New Zealand Application Serial No. 622439, Office Action dated Mar. 24, 2014", 2 pgs.
"New Zealand Application Serial No. 622439, Office Action dated Jun. 6, 2014", 2 pgs.
"New Zealand Application Serial No. 622473, First Examination Report dated Mar. 27, 2014", 3 pgs.
"New Zealand Application Serial No. 622473, Office Action dated Jun. 19, 2014", 2 pgs.
"New Zealand Application Serial No. 628161, First Examination Report dated Aug. 25, 2014", 2 pgs.
"O'Reilly.com", [Online]. Retrieved from the Internet: <URL: http://oreilly.com/digitalmedia/2006/01/01/mac-os-x-screenshot-secrets.html, (Jan. 1, 2006), 10 pgs.
"Registering an Application to a URI Scheme", Microsoft, [Online]. Retrieved from the Internet: <URL: http://msdn.microsoft.com/en-us/library/aa767914.aspx>, (accessed Apr. 4, 2009), 4 pgs.
"Share Screenshots via Internet in Seconds", JetScreenshot.com, [Online]. Retrieved from the Internet: <URL: http://web.archive.org/web/20130807164204/http://www.jetscreenshot.com/>, (Aug. 7, 2013), 1 pg.
"SnagIt 8.1.0 Print Out", SnagIt Software release date Jun. 15, 2006, (Jun. 15, 2006), 6 pgs.
"SnagIt 8.1.0 Print Out 2", SnagIt-Software release date Jun. 15, 2006, (Jun. 15, 2006), 1-3.
"SnagIt Online Help Guide", TechSmith Corp., Version 8.1, http://download.techsmith.com/snagit/docs/onlinehelp/enu/snagit_help.pdf>, (accessed Feb. 7, 2007), 284 pgs.
"Toad for Oracle 11.6, Guide to Using Toad", Quest Software, (2012), 1-162.
"Trick: How to Capture a Screenshot As PDF, Annotate, Then Share It", Nitro, [Online]. Retrieved from the Internet: <URL: http://blog.nitropdf.com/2008/03/04/trick-how-to-capture-a-screenshot-as-pdf-annotate-it-then-share/>, (Mar. 4, 2008), 2 pgs.
"Using the Clipboard", Microsoft, [Online]. Retrieved from the Internet: <URL: http://msdn.microsoft.com/en-us/library/ms649016.aspx>, (accessed Jun. 8, 2009), 20 pgs.
Abbey, Kristen, "Review of Google Docs", 2007: Currents in Electronic Literacy, http://currents.dwri.utexas.edu/spring07/abbey.html, (2007), 2 pgs.
Adams, Michael, et al., "Worklets: A Service-Oriented Implementation of Dynamic Flexibility in Workflows", OTM 2006, LNCS 4275, (2006), 291-308.
Antoshenkov, Gennady, "Dictionary-based order-preserving string compression", The VLDB Journal, #6, (1997), 1-14.
Baker, Jason, et al., "Megastore: Providing Scalable, Highly Available Storage for Interactive Services", 5th Biennial Conference on Innovative Data Systems Research (CIDR '11) Jan. 9-12, 2011, Asilomar, California, USA., (Jan. 2011), 223-234.
Bernstein, Philip, et al., "Hyder—A Transactional Record Manager for Shared Flash", 5th Biennial Conference on Innovative Data Systems Research (CIDR '11) Jan. 9-12, 2011, Asilomar, California, USA, (Jan. 2011), 9-20.
Bluttman, et al., "Excel Formulas and Functions for Dummies", Wiley Publishing, Inc, (2005), 280, 284-286.
Brandel, Mary, "Data Loss Prevention Dos and Don'ts", CSO—Data loss prevention tools provide powerful security capabilities—if used correctly, (Oct. 10, 2007), 5 pgs.
Chang, Fay, et al., "Bigtable: A Distributed Storage System for Structured Data", Google, Inc., (Jun. 2, 2008), 1-14.
Chaudhuri, Surajit, et al., "An Overview of Business Intelligence Technology", Communications of the ACM, vol. 54, No. 8., (Aug. 2011), 88-98.
Chung, Chin-Wan, "Dataplex: An Access to Heterogeneous Distributed Databases", Communications of the ACM, Association for Computing Machinery, Inc., vol. 33, No. 1, (Jan. 1, 1990), 70-80.
Conner, Nancy, "Google Apps: The Missing Manual", (May 1, 2008), 15 pgs.
Conner, Nancy, "Remove a published document or blog post", Google Apps: The Missing Manual: The Missing Manual section—Sharing and Collaborating on Documents, XP-002721325, (2008), 15 pgs.
Devanbu, Prem, et al., "Authentic Third-party Data Publication", 19 pgs.
Dreyer, Werner, et al., "An Object-Oriented Data Model for a Time Series Management System", IEEE—Proceedings of the 7th International Working Conference on Scientific and Statistical Datablse Management; Charlottesvile, Virginia USA, (1994), 12 pgs.
Elmasri, Ramez, et al., "Fundamentals of Database Systems", Fourth Edition—Chapter 14—Indexing Structures for Files, (2004), 40 pgs.
Ferreira, Lucas De Carvalho, et al., "A Scheme for Analyzing Electronic Payment Systems", (1997), 10 pgs.

(56) References Cited

OTHER PUBLICATIONS

Galliford, Miles, "SnagIt Versus Free Screen Capture Software: Critical Tools for Website Owners", [Online]. Retrieved from the Internet: <URL: http://www.subhub.com/articles/free-screen-capture-software>, (Mar. 27, 2008), 10 pgs.

Gill, Leicester, et al., "Computerised linking of medical methodological guidelines", 3rournal of Epidemiolog and Coimmunity Health 47, (1993), pp. 316-319.

Gu, Lifang, et al., "Record Linkage: Current Practice and Future Directions", (Jan. 15, 2004), 32 pgs.

Hogue, Andrew, et al., "Thresher: Automating the Unwrapping of Semantic Content from the World Wide Web", 14th International Conference on World Wide Web, WWW 2005, (May 2005), 86-95.

Hua, Yu, et al., "A Multi-attribute Data Structure with Parallel Bloom Filters for Network Services", HiPC 2006, LNCS 4297, (2006), 277-288.

Johnson, Maggie, "Introduction to YACC and Bison", (Jul. 8, 2005), 11 pgs.

Johnson, Steve, "Access 2013 on demand", Que Publishing, (May 9, 2013), 22 pgs.

Klemmer, Scott R, et al., "Where Do Web Sites Come From? Capturing and Interacting with Design History", Association for Computing Machinery, CHI 2002, (Apr. 2002), 1-8.

Kokossis, A, et al., "D7-Dynamic Ontology Managment system (Design)", h-TechSight Consortium Oct. 2002, (Oct. 2002), 27 pgs.

Lim, EE-Peng, et al., "Resolving Attribute Incompatibility in Database Integration: An Evidential Reasoning Approach", Proceedings. 10th International Conference Data Engineering. Department of Computer Science, University of Minnesota, [Online] retrieved from the internet: <http://reference.kfupm.edu.sa/content/r/e/resolving_attribute_incompatibility_in_d_531691.pdf>, (Feb. 1994), 154-163.

Litwin, Witold, et al., "Multidatabase Interoperability", Institute National de Recherche en Informatique et an Automatique, [Online] retrieved from the internet: <http://www.lamsade.dauphine.fr/~litwin/mdb-interoperability.pdf>, (Dec. 1986), 9 pgs.

Metzas, G., et al., "An Architecture for Intelligent Assistance in the Forecasting Process", Proceedings of the 28th Annual Hawaii International Conference on System Sciences, (1995), 167-176.

Miklau, Gerome, et al., "Securing history: Privacy and accountability in database systems", 3rd Biennial Conference on Innovative Data Systems Research (CIDR), (2007), 387-396.

Nadeau, David, et al., "A survey of named entity recognition and classification", Lingvisticae Investigationes, 30(1), (Jan. 15, 2004), 20 pgs.

Niepert, M., et al., "A Dynamic Ontology for a Dynamic Reference Work", JCDL '07 Proceedings, ACM, (Jun. 2007), 10.

Nierman, Andrew, et al., "Evaluating Structural Similarity in XML Documents", U of Michigan, (2002), 1-6.

Nin, Jordi, et al., "On the Use of Semantic Blocking Techniques for Data Cleansing and Integration", 11th International Database Engineering and Applications Symposium (IDEAS 2007), (2007), 9 pgs.

Peng, Daniel, et al., "Large-scale Incremental Processing Using Distributied Transactions and Notifications", OSDI, (2010), 1-15.

Qiang, Bao-Hua, et al., "A Mutual-Information-Based Approach to Entity Reconciliation in Heterogeneous Databases", 2008 International Conference on Computer Science and Software Engineering, (2008), 666-669.

Schroder, Stan, "15 Ways to Create Website Screenshots", [Online]. Retrieved from the Internet: <URL: http://mashable.com/2007/08/24/web-screenshots/>, (Aug. 24, 2007), 2 pgs.

Sekine, Satoshi, et al., "Definition, dictionaries and tagger for Extended Named Entity Hierarchy", LREC, (2004), 1977-1980.

Thomson, Alexander, et al., "The Case for Determinism in Database Systems", Proceedings of the VLDB Endowment, 3(1), (Sep. 2010), 70-80.

Wang, Guohua, et al., "Research on a Clustering Data De-Duplication Mechanism Based on Bloom Filter", IEEE, (2010), 5 pgs.

Warren, Christina, "TUAW Faceoff: Screenshot apps on the firing line", [Online]. Retrieved from the Internet: <URL: http://www.tuaw.com/2008/05/05/tuaw-faceoff-screenshot-apps-on-the-firing-line/>, (May 5, 2008), 11 pgs.

Winkler, William E, et al., "Record Linkage Software and Methods for Merging Administrative Lists", Bureau of the Census Statistical Research Division: Statistical Research Report Series, No. RR2001/03, (Jul. 23, 2001), 11 pgs.

Wollrath, Ann, et al., "A Distributed Object Model for the Java System", Proceedings of the 2nd Conference on USENEX, Conference on Object-Orients Technologies and Systems, (Jun. 1996), 219-231.

Yang, Yudong, "HTML Page Analysis Based on Visual Cues", 2001 IEEE, (2001), 859-864.

Zhao, et al., "Entity Matching Across Heterogeneous Data Sources: An Approach Based on Constrained Cascade Generalization", Data & Knowledge Engineering, vol. 66, No. 3, (Sep. 2008), 368-381.

\* cited by examiner

TRANSFORMING INSTRUCTIONS FOR COLLABORATIVE UPDATES

TECHNICAL FIELD

Embodiments of the present disclosure generally relates to the technical field of special-purpose machines that facilitate interactions for transforming instructions that result in a system-wide update to a user interface including computerized variants of such special-purpose machines and improvements to such variants, and to the technologies by which such special-purpose machines become improved compared to other special-purpose machines that handle instructions for a system-wide update (e.g., back-end update). Specifically, the present disclosure addresses systems and methods to transform instructions for the system-wide update of a user interface.

BACKGROUND

Sometimes instructions for updating a user interface conflict with one another. For example, an instruction to perform an update to a user interface may conflict with a further instruction to perform a similar update to the user interface. Conventional systems and methods are often unable to resolve these conflicts. Moreover, some instructions may be delayed during transmission which causes the instructions to be received out of order. Accordingly, conventional systems are unable to handle these conflicts and delays and thus fail to perform a proper update to the user interface.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
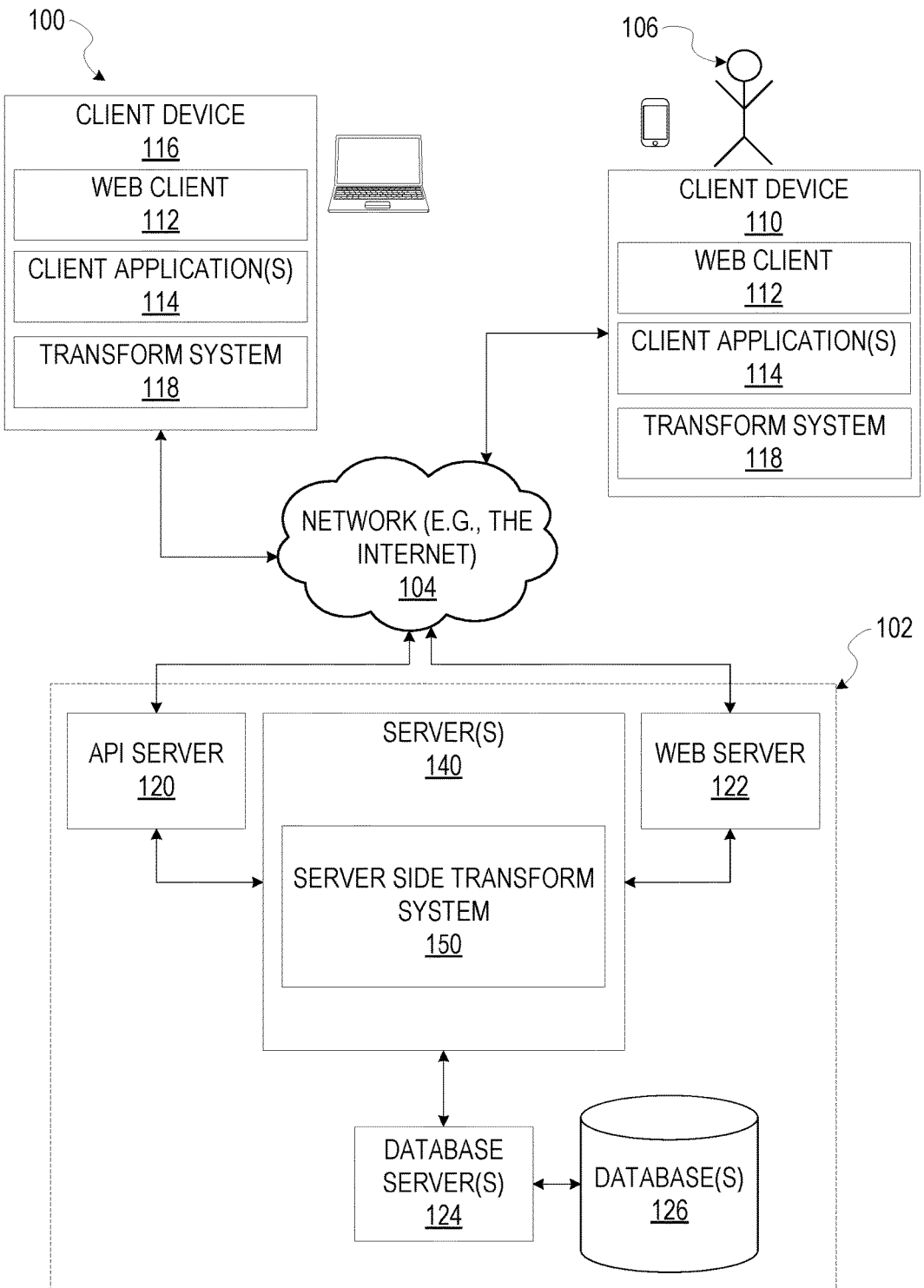
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various example embodiments of the subject matter discussed herein. It will be evident, however, to those skilled in the art, that embodiments of the subject matter may be practiced without these specific details.

In various example embodiments, a system and method to enable a plurality of devices to make collaborative edits to a user interface are described herein. The user interface is shared among the plurality of devices. In other words, each of the plurality of devices displays a respective local version of the user interface on its screen. In addition to the plurality of devices, a server maintains a database that stores and manages the collaborative edits made by the plurality of devices.

In various example embodiments, one or more elements are depicted in the user interfaces of a plurality of devices. The plurality of devices can collaborate together and make edits to the shared element(s) depicted in the devices' user interfaces. Each device optimistically executes instruction(s) that edit the element(s) depicted in the user interface. In other words, each of the plurality of devices executes one or more instructions that may edit the element(s) depicted under the assumption that there is not a conflicting edit to the element(s) by another device, and each of the plurality of devices send the instructions to a server under the assumption that the instructions will be accepted or executed by the server in its storage and management of its version of the element(s). Once received, the server in some instances may reject or accept the instructions provided from the plurality of devices.

In some instances, the server receives instruction(s) that may conflict with previously received instructions and/or its version of the shared element(s). In the event of a conflict, the server may reject the instruction(s) and may send a notification to the device about the conflict and/or that the instruction(s) were rejected or the device may not receive a confirmation that its instruction(s) were accepted or executed by the server. Accordingly, the client device may undo the instructions on its local version of the user interface.

In some instances, the server may send system-wide instruction(s) that may conflict with local instructions already executed by a client device. Accordingly, the client device may undo the local instructions, execute the system-wide instructions, transform the local instructions, re-execute the transformed local instructions, and/or send the transformed local instructions to the server. In some instances, the system-wide instructions includes instructions received from another client device in communication with the server.

In various example embodiments, the device flags front-end only instructions that do not need to be transmitted or communicated to the server. In some embodiments, the front-end only instructions may comprise one or more changes to the user interface. In some other embodiments, the front-end only instructions comprise commands for changing the display of the user interface. In some other embodiments, the front-end only instructions do not need to be executed by other devices and/or the server. In some other embodiments, the front-end only instructions may change or cause the display of a pop-up menu, context menu, or drop down menu.

In some other embodiments, the front-end only instructions are preceded by and/or followed by other local instructions that are not front-end only instructions. The other local instructions are generated by the client device as instructions for a system-wide update. In some embodiments, the other local instructions may conflict with a system-wide instruction received by the client device. For example, the system-wide instruction performs an update that precedes an update corresponding to the other local instructions generated by the client device. As such, the client device may transform the other local instructions and not transform the front-end only instructions because the front-end only instructions are not affected by the system-wide instructions, the front-end only instructions are not executed on any other device, and/or the device avoids a screen flicker, such as hiding a context menu and re-displaying the context menu.

Example methods (e.g., algorithms) facilitate displaying an update to a user interface, and example systems (e.g., special-purpose machines) are configured to facilitate displaying the update to the user interface. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

With reference to FIG. 1, an example embodiment of a high-level client-server-based network architecture 100 is shown. A networked system 102, in the example forms of a network-based transform system, provides server-side functionality via a network 104 (e.g., the Internet or wide area network (WAN)) to one or more client devices (e.g., client device 110 or client device 116).

The client device (e.g., the client device 110 or the client device 116) may comprise, but is not limited to, a mobile phone, desktop computer, portable digital assistants (PDAs), smart phones, tablets, laptops, multi-processor systems, microprocessor-based or programmable consumer electronics, or any other communication device that a user may utilize to access the networked system 102. In some embodiments, the client device includes components that are used to display information (e.g., in the form of user interfaces). In further embodiments, the client device may comprise one or more of touch screens, accelerometers, gyroscopes, cameras, microphones, global positioning system (GPS) devices, and so forth.

In one embodiment, the networked system 102 is a network-based transform system that causes display of the user interfaces on each of the client devices 110 and 116. Further, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client devices 110 include one or more applications (also referred to as "apps") such as, but not limited to, a web browser, messaging application, electronic mail (email) application, or a map application that displays geographic locations and areas. FIG. 1 illustrates, for example, a web client 112 (e.g., a browser that communicates with the Internet), and a client application 114 executing on each of the client devices 110 and 116. Each of the client devices 110 and 116, for example, each displays a local version of a user interface. The user interface may display a spreadsheet, a word processing document, a map of a geographical area, and the like. In various example embodiments, the user interface depicts an element, and the element occupies a section of the user interface. Further, in some instances, each of the client devices 110 and 116 provides instructions for sending updates to server 140. As also shown in FIG. 1, each of the client devices 110 and 116 includes a transform system 118 (e.g., a transform component) that enables the client device 110 or 116 to send local instructions to the server. For example, the transform system 118 enables each of the client devices 110 and 116 to transform one or more instructions. The one or more transformed instructions may then be executed to perform an update to the local version of a user interface. Moreover, the transformed instructions may be sent to a server 140 for acceptance, storage, and/or execution.

A user 106 may be a person, a machine, or other means of interacting with the client device 110 or the client device 116. In example embodiments, the user 106 is not part of the network architecture 100, but interacts with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more servers 140. The servers 140 host a server side transform system 150 which may comprise one or more modules, engines, or applications and each of which may be embodied as hardware, software, firmware, circuitry, or any combination thereof. The servers 140 are, in turn, shown to be coupled to one or more database servers 124 that facilitate access to one or more information storage repositories or database(s) 126. In an example embodiment, the databases 126 are storage devices that store information communicated (e.g., updates to a user interface) from the client devices to the server side transform system 150.

The server side transform system 150 likewise provides a number of functions to accept or reject updates and/or perform or facilitate updates to a server version or representation of the shared element(s). The server side transform system 150 may also provide a number of publication functions and services to users 106 that access the networked system 102. While the server side transform system 150 is shown in FIG. 1 to both form part of the networked system 102, it will be appreciated that, in alternative embodiments, the server side transform system 150 may form a service that is separate and distinct from the networked system 102.

In some embodiments, the server side transform system 150 determines whether a received update from a device can be accepted or stored. If the update conflicts with a previously accepted update, the server side transform system 150 may send a rejection notification and/or decline to send a confirmation of acceptance to the device that transmitted the conflicting update. In some embodiments, the server side transform system 150 maintains a local version or representation of the shared element(s), and the server side transform system 150 executes accepted instructions received from the client devices to complete an update. In some example embodiments, the server side transform system 150 stores the completed system-wide update in a database (e.g., database 126).

Further, while the client-server-based network architecture 100 shown in FIG. 1 employs a client-server architecture, the present inventive subject matter is of course not limited to such an architecture, and could equally well find application in a distributed, or peer-to-peer, architecture system, for example.

Any of the systems or machines (e.g., databases, devices, servers) shown in FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to at least FIGS. 3-5, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines (e.g., databases, devices, servers).

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines (e.g., databases, devices, servers) illustrated in FIG. 1 may be combined into a single system or machine, and the functions described herein for any single system or machine may be subdivided among multiple systems or machines (e.g., databases, devices, servers).

Figure 2:
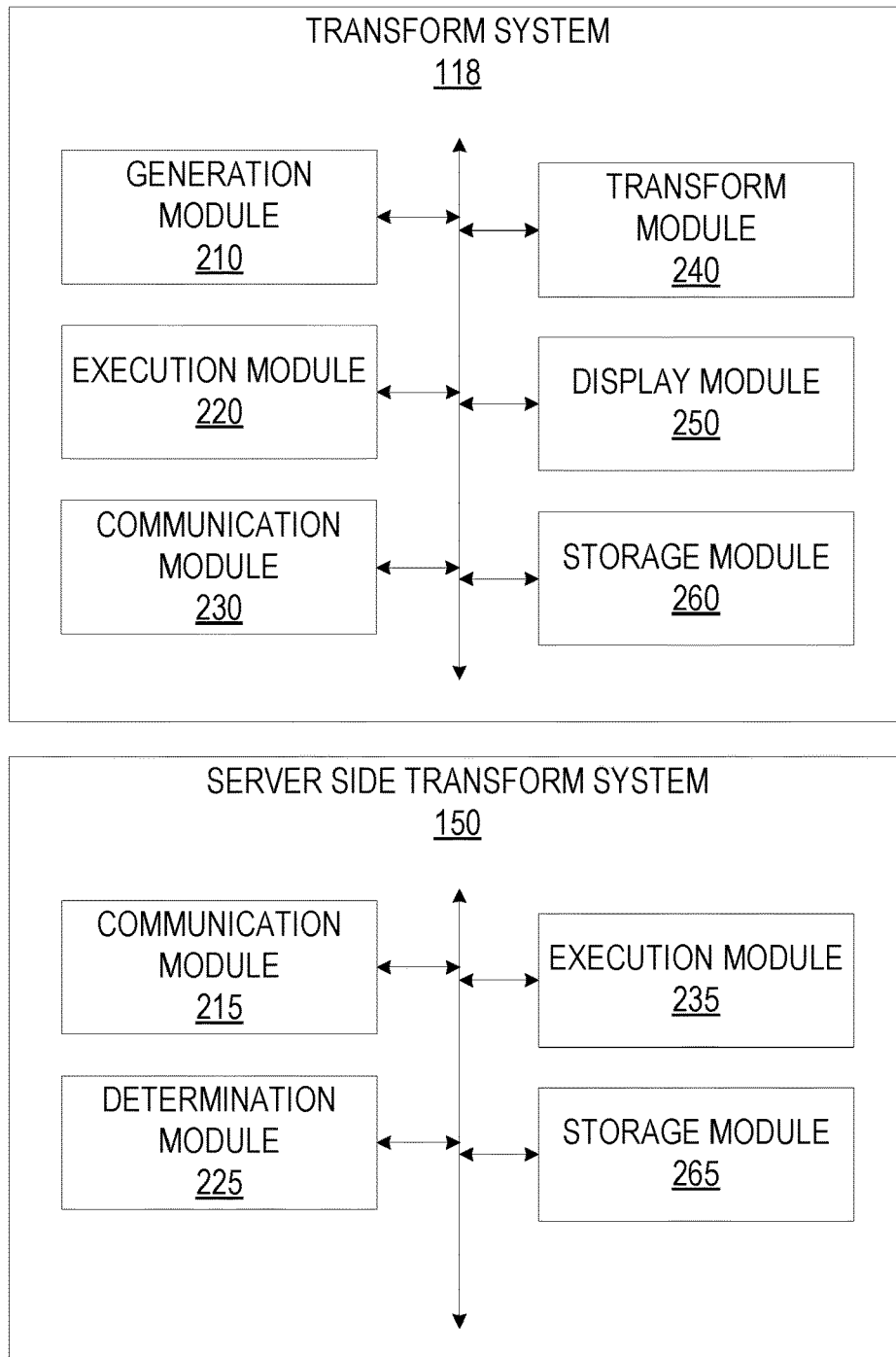
FIG. 2 is a block diagram illustrating components of a transform system, according to some example embodiments.

FIG. 2 is a block diagram illustrating components of the transform system 118 and components of the server side transform system 150, according to some example embodiments. In various example embodiments, the transform system 118 performs operations that include generating or transforming instructions for an update (e.g., front-end only update or system-wide update). The transform system 118 further performs operations to transmit the update to a server. Moreover, the modules described in FIG. 2 enable the transform system 118 to perform these operations. The transform system 118 is shown as including a generation module 210, an execution module 220, a communication module 230, a transform module 240, a display module 250, and a storage module 260 all configured to communicate with each other (e.g., via a bus, shared memory, or a switch).

The modules described in FIG. 2 enable the server side transform system 150 to accept, reject, store, and/or execute received operations from client devices. The server side transform system 150 is shown as including a communication module 215, a determination module 225, an execution module 235, and a storage module 265 all configured to communicate with each other (e.g., via a bus, shared memory, or a switch).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices.

In various example embodiments, the generation module 210 is configured to generate a group of instructions that correspond to an update of an element (e.g., shared element) in a user interface. Examples of the update of the element include: annotating the element depicted in the user interface; moving the element depicted in the user interface; creating the element depicted in the user interface; deleting the element depicted in the user interface; or re-sizing the element depicted in the user interface. Other examples of the update include, but are not limited to: adding text, deleting text, changing a formatting of text, adding columns to a spreadsheet, deleting columns from a spreadsheet, resizing the columns of a spreadsheet, inputting an entry to a spreadsheet, and the like. In various example embodiments, the update is any suitable combination of any of the examples listed above.

The group of instructions may be used to perform a front-end only update of a local version of a user interface, a system-wide update of one or more client devices' user interfaces, or both. For instance, the group of instructions, when executed by an execution module 220, perform one or more front-end only updates and/or one or more system-wide updates of the element in a local version of the user interface (e.g., user interface of the client device). The front-end only update may include a dialogue box or a menu that is displayed on the client device. Moreover, the group of instructions, when executed by a server, perform one or more system-wide updates of the element.

In various example embodiments, the server version of the element(s) is stored in a database (e.g., database 126), and the server version is updated when the group of instructions are executed by the server 140.

In various example embodiments, the execution module 220 is configured to execute the group of instructions for the user interface of the client device. In further example embodiments, the group of instructions are transformed by the transform module 240, as further explained below. Accordingly, the execution module 220 is further configured to execute the transformed group of instructions. In various example embodiments, execution of the group of instructions completes an update of the user interface of the client device.

In various example embodiments, the communication module 230 is configured to receive an indication that a group of one or more instructions conflicts with a system-wide update. In various example embodiments, the communication module 230 is further configured to send or transmit the instructions to the server 140, as further explained below.

In various example embodiments, the transform module 240 is configured to transform the group of instructions. In some instances, the transform module 240 changes a parameter included in the group of instructions. For example, the transform module 240 changes a value of a parameter included in the group of instructions. Moreover, in some instances, the parameter included in the group of instructions corresponds to the property of the element being that is changed by the previous update. For example, the previous update may include moving the element to a new location in the user interface. Further to the example, the group of instructions may include edits to the element at its previous location. Therefore, the group of instructions need to be transformed in order to correct for the new location that resulted from the previous update.

As another example, the previous update may include resizing the element. Further to the example, the group of instructions may include edits to the element that do not factor in the resizing. Therefore, the group of instructions need to be transformed in order to correct for the resizing that resulted from previous update.

In various example embodiments, the display module 250 is configured to cause display of the update of the user interface on the client device. In other words, the display module 250 displays the local version of the user interface on the client device.

In various example embodiments, once the update is completed, the storage module 260 is configured to store the local version of the user interface into a database. Further, the storage module 265 is configured to retrieve the local version of the user interface from the database. The local version of the user interface includes the update of the element that was completed as a result of the execution of the group of instructions.

Referring to the server side transform system 150, in various example embodiments, the communication module 215 is configured to receive the group of instructions from the communication module 230. Moreover, the determination module 225 is configured to determine that the group of instructions conflict with a previous update or a previous group of instructions. For instance, the determination module 225 determines that the group of instructions affect a property of an element in the user interface that was changed by the previous update. Alternatively, the determination module 225 is configured to determine that the group of instructions do not conflict with the previous update. In further example embodiments, the communication module 215 receives a group of instructions transformed by the transform module 240 and the group of instructions do not conflict with the previous update.

In some embodiments, the communication module 215 provides a confirmation that server accepted the group of instructions or a notification that the server rejected the group of instructions. In some embodiments, the communication module 215 accepts the group of instructions but does not provide a confirmation to the sender of the group of instructions.

In various example embodiments, the execution module 235 is configured to execute the group of instructions received from the communication module 230. Execution of the group of instructions completes an update to the server version of the element.

In various example embodiments, the communication module 215 transmits data that causes execution and/or display of the system-wide update to the plurality of devices. The communication module 215 transmits the data through the network (e.g., network 104). As a result, the update to the element (e.g., shared element) appears in the user interface displayed by each of the plurality of devices.

In various example embodiments, the storage module 265 is configured to store the group of instructions and/or the system-wide update into a database. In some instances, the storage module 265 saves the group of instructions and/or server version of the updated element into the database. Further, the storage module 265 is configured to retrieve the group of instructions and/or server version from the database at a later time.

In some instances, the execution module 235 is configured to convert the instructions into a particular scripting language (e.g., compiling the instructions in JavaScript). In some instances, the communication module 215 sends the converted instructions to the plurality of devices. In some instances, the storage module 265 stores the converted instructions into the database.

Referring back to FIG. 1, the transform system 118 is configured to receive a request, from a user of the client device, to display a front-end only update in a user interface of the client device. In other words, the front-end only update does not get communicated to the server. In some instances, the front-end only update is a dialog box or a menu that is displayed in the user interface the requesting device (e.g., client device 110). In some instances, the front-end update is changing an appearance of an element that is displayed in the user interface of the requesting device (e.g., client device 110).

In various example embodiments, the generation module 210 is further configured to generate a third group of instructions for an update of a further element depicted in a user interface. Moreover, the further group of instructions comprise one or more front-end only instructions. The front-end only instructions are instructions that cause the front-end only update. In various example embodiments, the generation module 210 is further configured to generate a filtered group of instructions that exclude the front-end only instructions. Accordingly, in some instances, the filtered group of instructions are transmitted to the server by the communication module 230. As stated earlier, the front-end only instructions are not affected by the system-wide instructions. Also, the front-end only instructions are not executed on any other device. Therefore, these front-end only instructions are not transmitted to the server by the communication module 230.

In various example embodiments, the transform system 118 is configured to apply a flag that indicates instructions that are used by the execution module 220 to perform the front-end only update and therefore do not need to be communicated by the communication module 230 to the server. The instructions for the front-end only update are generated by the client device. Moreover, the flag is applied in order to prevent the instructions for the front-end only update from being sent to the server. In some embodiments, the transform module 240 may not execute instructions for front-end only updates to resolve conflict(s) between local updates and system-wide updates.

Figure 3:
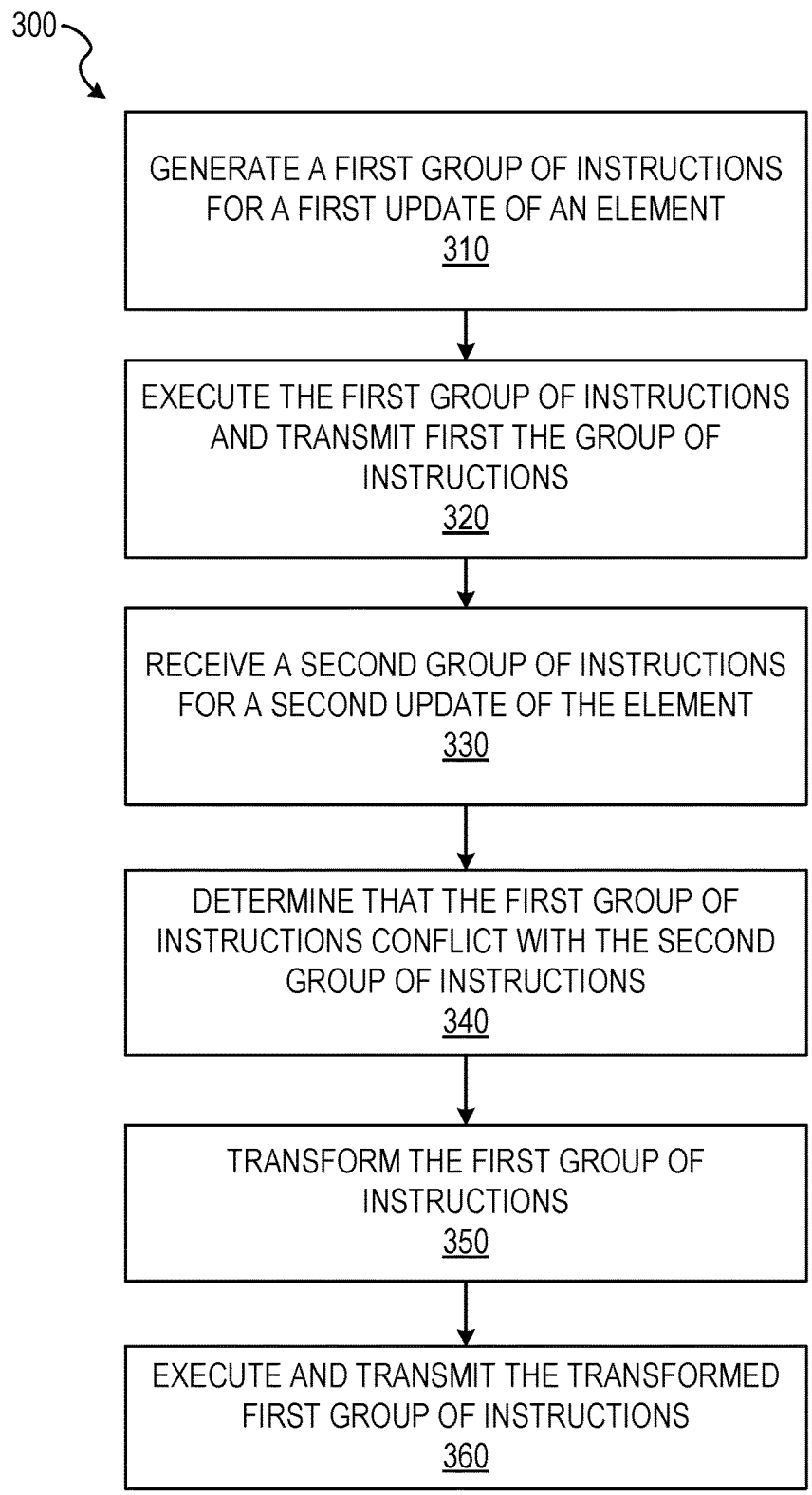
FIGS. 3-5 are flowcharts illustrating operations of the transform system in performing a method of transforming instructions for an update, according to some example embodiments.
Figure 4:
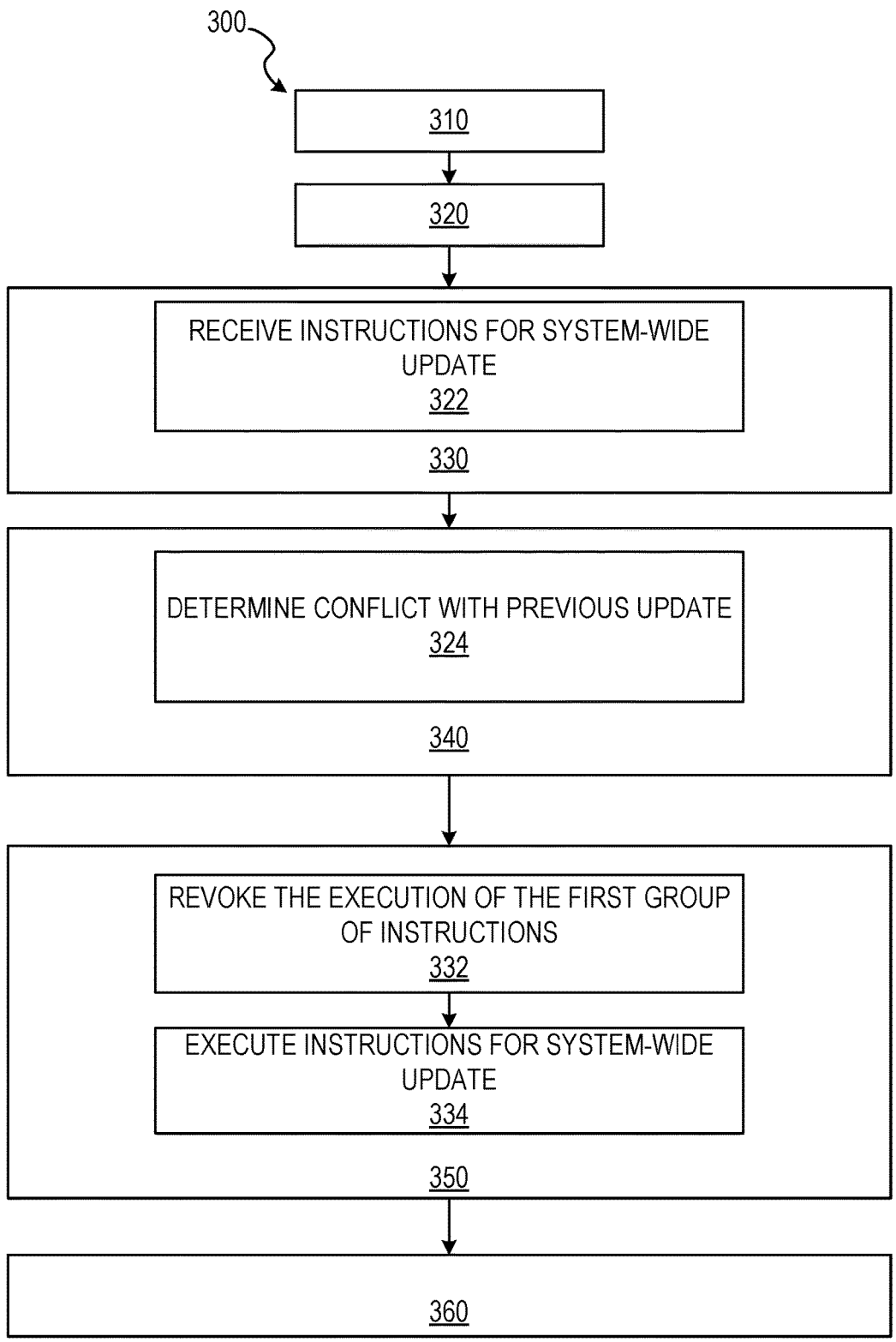
Figure 5:
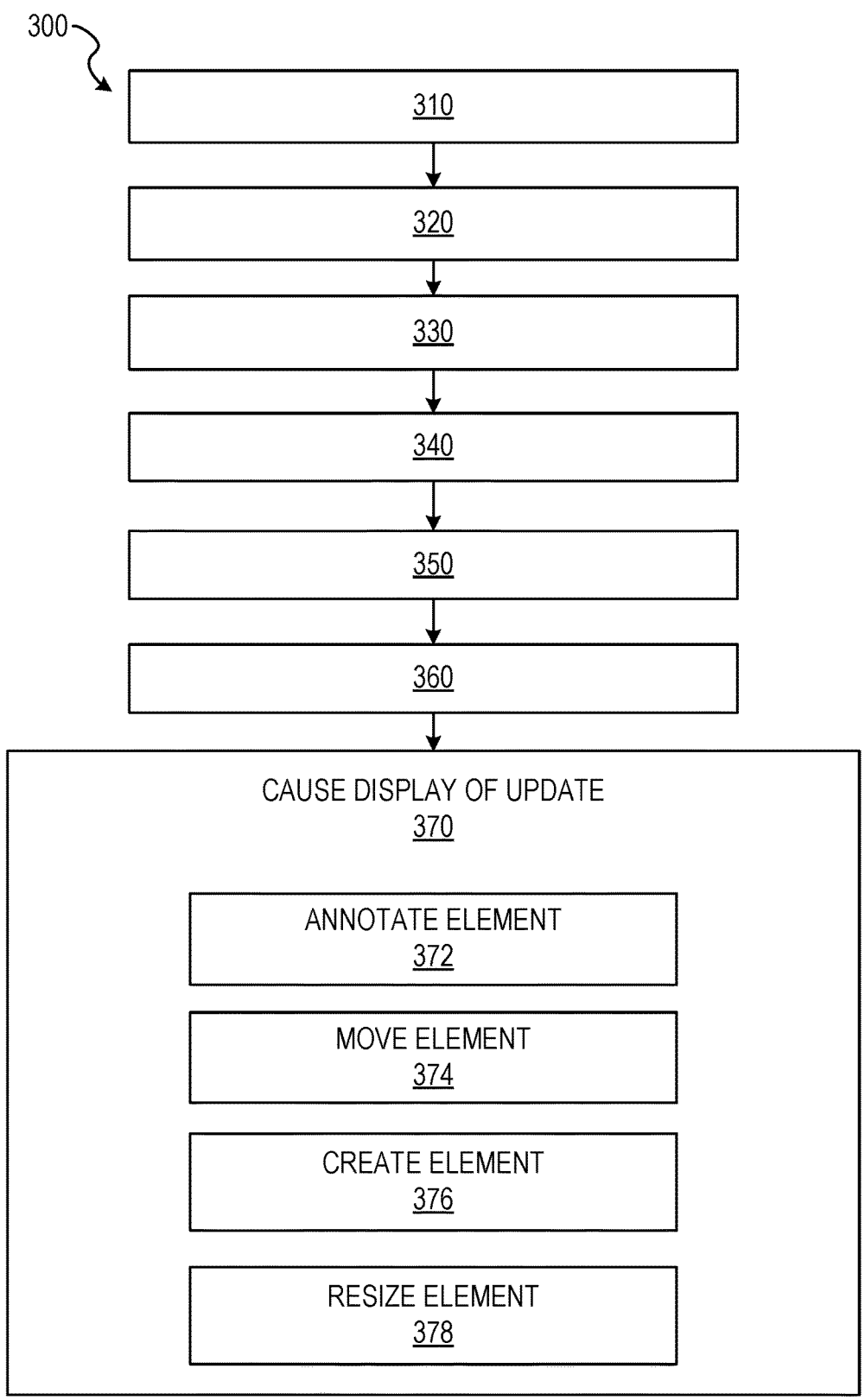

FIG. 3-5 are flowcharts illustrating operations of the transform system 118 in performing a method 300 of transforming instructions for an update, according to some example embodiments. Operations in the method 300 may be performed in part or in whole by components of transform system 118, which can be embodied either in whole or in part in one or more client devices (e.g., client device 110, client device 116) of the networked system 102 using components described above with respect to FIG. 2. Accordingly, the method 300 is described by way of example with reference to the transform system 118. However, it shall be appreciated that at least some of the operations of the method 300 may be deployed on various other hardware configurations or be performed by similar components residing elsewhere in the client-server-based network architecture 100. Therefore, the method 300 is not intended to be limited to the transform system 118. As shown in FIG. 3, the method 300 includes operations 310, 320, 330, 340, 350, and 360.

At operation 310, the generation module 210 generates a group of instructions for an update of an element depicted in a user interface. In some instances, the group of instructions, when executed by the execution module 220, perform a front-end only update of an element depicted in a user interface of the client device. In further embodiments, the group of instructions are also usable by the server 140 to perform a system-wide update to an element. In various example embodiments, the group of instructions are generated by or originate from a client device (e.g., client device 110, client device 116). As stated earlier, the server version of the element and/or group of instructions are transmitted to the one or more client devices. In other words, the one or more client devices are viewing the server version of the element and/or have executed the group of instructions sent by the server.

The element exhibits several properties. For example, the element occupies a location or a section of the user interface (e.g., element location). In other words, the element appears at the element location in the user interface. In various example embodiments, the element also displays information at the element location in the user interface. In other example embodiments, the element corresponds to a certain size. The location of the element, the information displayed by the element, and the size of the element are each examples of a property exhibited by that element.

As stated earlier, the user interface displays a spreadsheet, a word processing document, a map of a geographical area, or the like. As a result, in the case of the spreadsheet, the element is a cell from the spreadsheet that displays a value. In the case of the word processing document, for example, the element is a word or a letter that appears at a specific line in the word processing document. In the case of the geographical area, for example, the element is an object that is depicted in the geographical area. Further, the object depicted in the geographical area may correspond to real-life objects (e.g., buildings, vehicles, structures, or personnel) that are present in the geographical area. The object depicted in the geographical area may also correspond to events that take place within the geographical area.

Examples of the update of the element include: annotating the element depicted in the user interface; moving the element depicted in the user interface; creating the element depicted in the user interface; deleting the element depicted in the user interface; or re-sizing the element depicted in the user interface. In various example embodiments, the update is a suitable combination of any of the examples listed above.

In some instances, the update includes adding additional information to the information already displayed at the element location in the user interface. In some instances, the element depicted in the user interface is moved, therefore changing the element location. In some instances, a new element is generated or created in the user interface.

At operation 320, the execution module 220 executes the generated group of instructions. As a result, a local update of the element is shown in a user interface of the client device that generated the group of instructions. Moreover, at operation 320, the communication module 230 transmits the generated group of instructions to a server (e.g., server 140) in order to propagate the update of the local version of the user interface to the server and then to the other client devices.

At operation 330, the communication module 230 receives an indication and/or fails to receive a confirmation that the group of instructions conflicts with a previous system-wide update that corresponds to instructions previously accepted, stored, and/or executed by a server (e.g., server 140). In further instances, the communication module 230 receives, from the server, a second group of instructions for a second update of the element, as further explained below with in the description of FIG. 4.

At operation 340, the communication module 230 determines that a received group of instructions from the server conflict with instructions previously executed by the client device in a local update. As further explained below, the indication received may include a notification from the server 140.

In various example embodiments, the group of instructions conflicts with a previous system-wide update of an element. The conflict occurs because the generated group of instructions changes or modifies a property of the element that was also affected by the previous update. For example, the previous update may include instructions to move the element to a new location. Further to the example, the generated group of instructions may include edits to the element at its previous location. Therefore, the generated group of instructions need to be undone (e.g., reversed) or transformed in order to correct for the new location that resulted from execution of instructions corresponding to the previous update.

At operation 350, the transform module 240 transforms the generated group of instructions by changing one or more parameters included in the group of instructions. The parameter applied to the group of instructions may pertain to the property of the element that was changed by the previous system-wide update. For example, the parameter may indicate the element location, or the element size.

At operation 360, the execution module 220 executes the transformed group of instructions. As a result, a transformed update of the element is shown in a user interface of the client device that generated the group of instructions. At operation 360, the communication module 230 transmits the transformed group of instructions to the server (e.g., server 140) in order to propagate the transformed update of the user interface of the client device to the server and other client devices. The other client devices may execute and/or display the transformed update on their respective user interfaces.

In other example embodiments, transform system 118 only performs steps 310, 320, and 330. In other instances, transform system 118 further undoes (e.g., reverses, cancels, perform an inverse operation) the generated group of instructions.

As shown in FIG. 4, the method 300 may include one or more of operations 322, 324, 332, and 334.

At operation 322, the communication module 230 receives the instructions previously accepted, stored, and/or executed by the server. In some instances, the instructions previously accepted, stored, and/or executed by the server conflict with the group of instructions. As stated previously, the group of instructions are generated by and originated from a client device among the one or more devices (e.g., group of devices). In other words, the instructions previously accepted, stored, and/or executed may be a second group of instructions for a second update of the element (e.g., shared element). In various example embodiments, the instructions are received as part of a notification.

At operation 324, the communication module 230 determines that the group of instructions conflicts with a previous system-wide update. The instructions previously accepted, stored, and/or executed by the server (e.g., second group of instructions) corresponds to a previous system-wide update and thus conflicts with the group of instructions. Since the client device did not receive the second update prior to generating the group of instructions, the group of instructions may be generated based on an incorrect version of one or more elements of the user interface (e.g., a previous state of a shared element in the user interface). In this regard, execution of the second group of instructions synchronizes the client device's version of the elements so that it is consistent with the server version and/or other client devices. In various example embodiments, the previous state of the shared element is a state of the shared element prior to the previous system-wide update to the shared element.

In some instances, the previous instructions are configured (e.g., programmed) to be executed prior to the group of instructions. For instance, the second group of instructions may be generated or programmed based of a state of the element prior to an update from the first group of instructions. However, the second group of instructions are received from the server after the first group of instructions are executed.

At operation 332, the execution module 220 revokes (e.g., resizing an element by 0.5 after resizing the element by 2, moving an element by 100 pixels to the left after moving the element by 100 pixels to the right, deleting text after inserting the text, adding a column after removing a column, removing a value after adding a value, redrawing a feature of an element after it has been deleted) the execution of the group of instructions in response to the conflict. The result of the revocation effectively causes a roll back of the update of the element depicted in the user interface of the client device. As stated earlier, examples of the update of the element include: annotating the element depicted in the user interface; moving the element depicted in the user interface; creating the element depicted in the user interface; deleting the element depicted in the user interface; or re-sizing the element depicted in the user interface. In various example embodiments, the update is a suitable combination of any of the examples listed above.

At operation 334, the execution module 220 executes the instructions previously accepted, stored, and/or executed by the server (e.g., the second group of instructions) received at the operation 330. Execution of the previous instructions performs an update that takes precedence before the update corresponding to the first group of instructions generated at the operation 310. Once the instructions previously accepted, stored, and/or executed by the server are executed, the first group of instructions, as is and/or transformed, can be appropriately executed thereafter.

As shown in FIG. 5, the method 300 may include one or more of operations 370, 372, 374, 376, and 378. Further, each of the operations 372, 374, 376, and 378 may be performed as part of the operation 370.

At operation 370, the display module 250 is configured to cause display of the update to a user interface of the client device. In various example embodiments, the update includes any suitable combination of the operations 372, 374, 376, and 378.

At operation 372, the display module 250 is configured to cause display of an annotation to the element. As stated previously, the update may include annotating the element with additional information. Therefore, the display module 250 transmits data that displays the additional information being used to annotate the element at the element location in the shared interface.

At operation 374, the display module 250 is configured to cause display of a movement of the element. As stated previously, the update may include moving the element to a new location in the local version of the user interface. Alternatively, the update also may include moving the element from the user interface to a further user interface. For example, the update moves an object from a first geographical area to a second geographical area. As another example, the update moves a value from a first cell in the spreadsheet to a second cell in the spreadsheet. As a further example, the update copies and pastes text from a first line in a word processing document to a second line in the word processing document.

At operation 376, the display module 250 is configured to cause display of a creation of the element. The group of instructions in some instances causes a new element to be created in the user interface (e.g., a new object in the geographical area, a new value, or new text). Accordingly, the display module 250 is configured to cause display of the new element in the user interface.

At operation 378 the display module 250 is configured to cause display of a resizing of the element. For instance, the group of instructions may cause the object to be resized. As a result, the display module 250 causes display of the resizing in accordance with the group of instructions. Resizing the element may include changing borders of the object depicted in the geographical area. Resizing the element also includes increasing or decreasing a font size.

Figure 6:
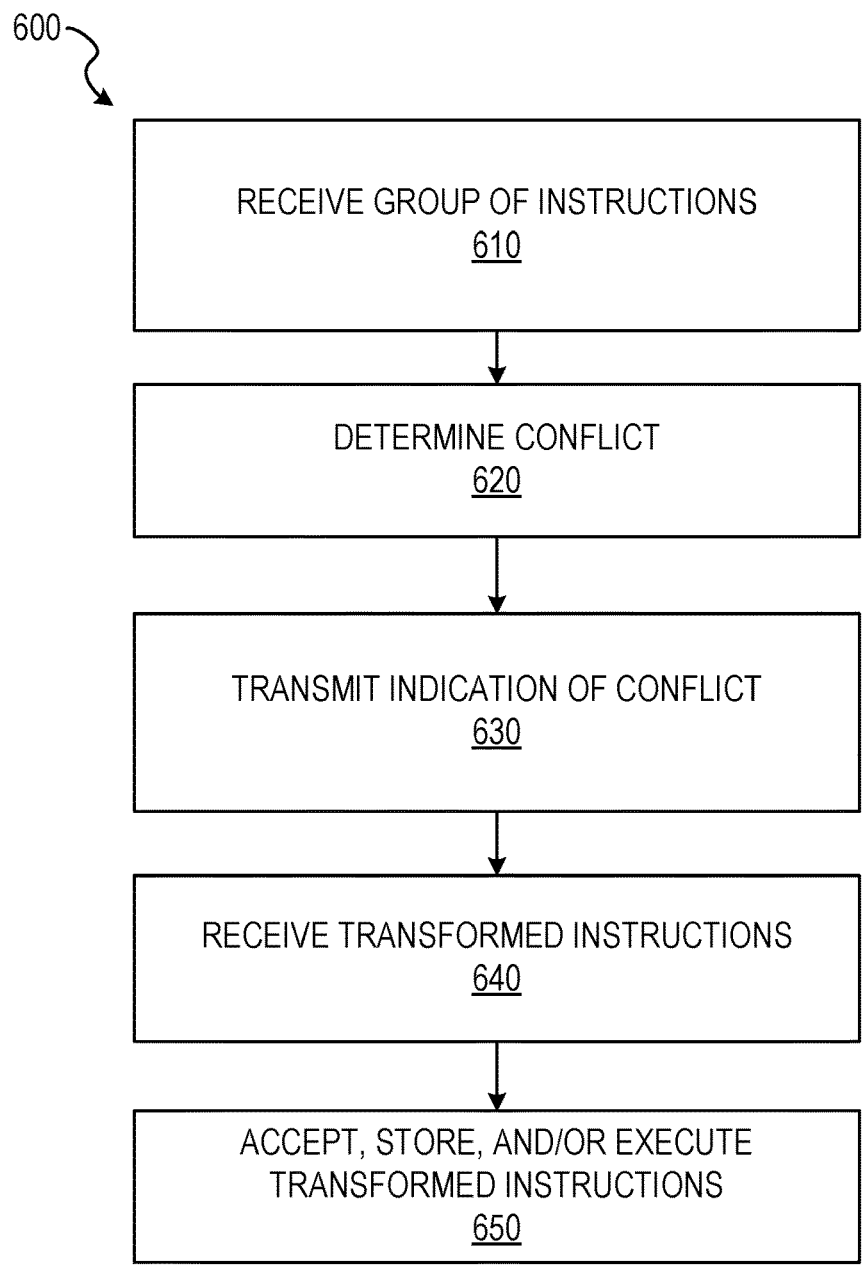
FIG. 6 is a flowchart illustrating operations of a server side transform system in performing a method of executing transformed instructions, according to some example embodiments.

FIG. 6 is a flowchart illustrating operations of a server side transform system 150 in performing a method 600 of accepting, storing and/or executing transformed instructions, according to some example embodiments. As shown in FIG. 6, the method 600 includes operations 610, 620, 630, 640, and 650.

At the operation 610, the communication module 215 receives a group of instructions from the communication module 230 of the transform system 118. As stated previously, the group of instructions are transmitted from the transform system 118 during the operation 320 of FIG. 3.

At the operation 620, the determination module 225 determines that the group of instructions conflict with a previous update. In various example embodiments, the previous update is received from another client device that communicates with the server side transform system 150. Moreover, the previous update may affect a property of the element which is also operated on by the group of instructions. In further embodiments, the determination module 225 may determine that the group of instructions do not conflict with a previous update.

At the operation 630, the communication module 215 transmits an indication that the group of instructions conflict with the previous update. In alternative embodiments, the communication module 215 may not transmit any indication of a conflict and the client device does not receive a confirmation of acceptance by the server within a predetermined period. As stated previously, the indication may be received by the transform system 118 at the operation 330 of FIG. 3.

At the operation 640, the communication module 215 receives a transformed group of instructions from the transform system 150. As stated previously, the transformed group of instructions are transmitted from the transform system 118 during the operation 360 of FIG. 3. At the operation 650, the execution module 235 accepts, stores and/or executes the transformed group of instructions.

Figure 7:
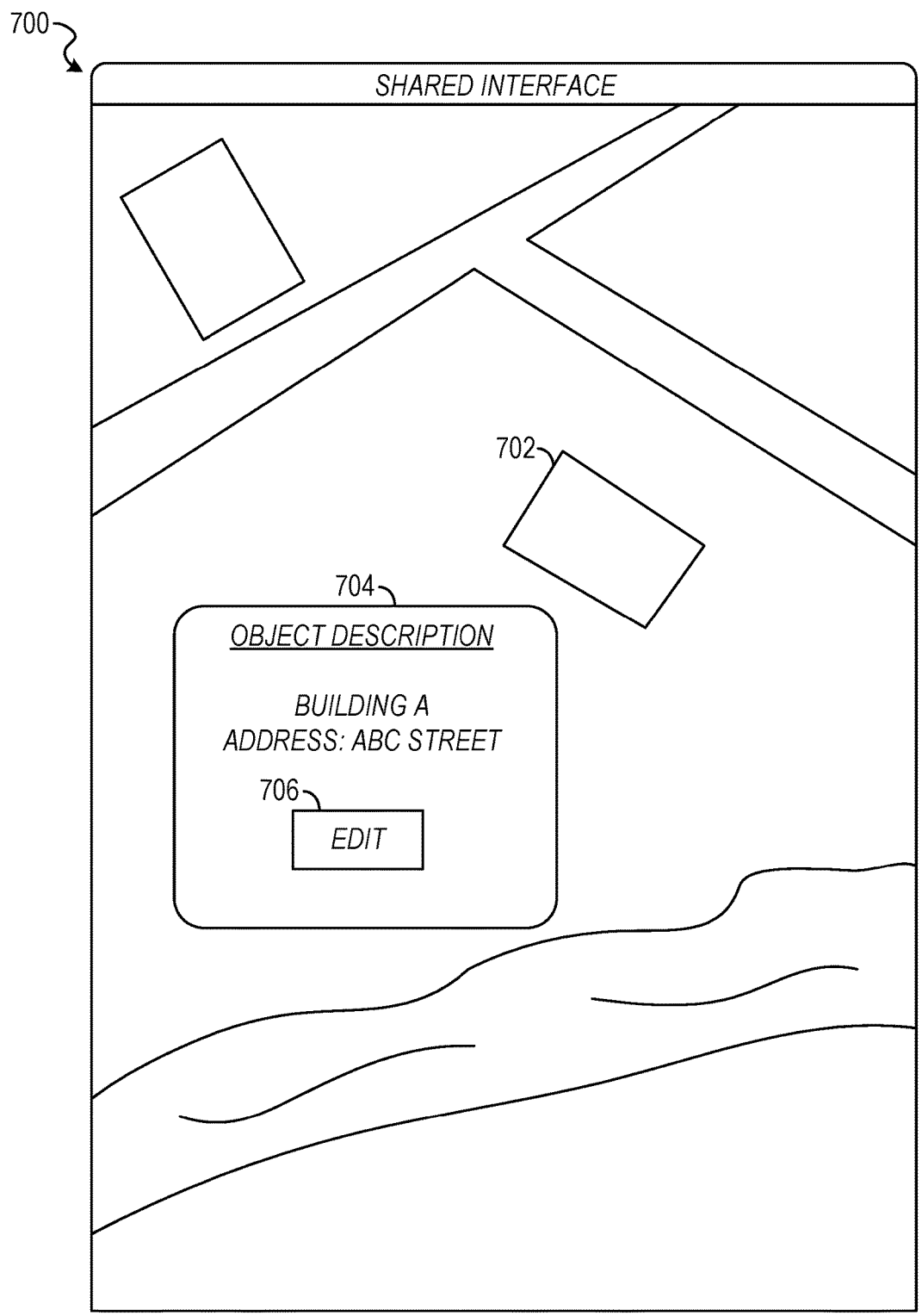
FIG. 7 is a block diagram that depicts a user interface, according to some example embodiments.

FIG. 7 is a block diagram that depicts a user interface, according to some example embodiments. The user interface 700 is displayed on each of a plurality of devices. Also included in the user interface is an object 702 and a description 704. The object 702 and the description 704 are elements that can each be updated by a device among the plurality of devices. Moreover, the description 704 includes information that is used to describe the object 702.

As shown in the user interface 700, the description 704 includes a button 706 that is selectable to edit the description. Selection of the button 706, in some instances, causes a request to be sent to the generation module 210. The request, in some instances, is a request to display a front-end only update on a client device. Although a button is shown in FIG. 7, in some instances, the description 704 itself can function as a trigger that is selectable to edit the description.

Figure 8:
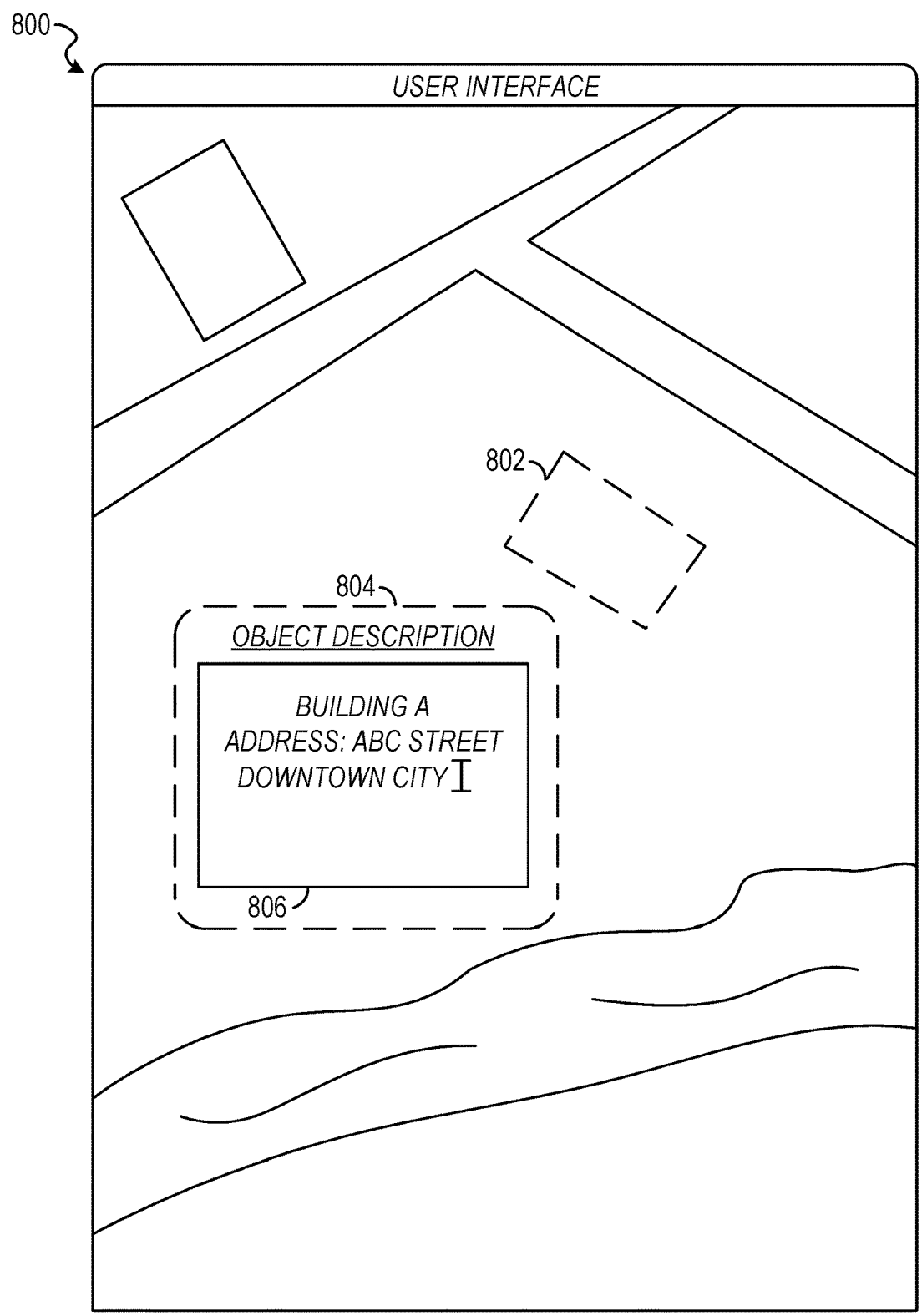
FIG. 8 is a block diagram that depicts a user interface of a client device, according to some example embodiments.

FIG. 8 is a block diagram that depicts a user interface of a client device, according to some example embodiments. The user interface 800 is displayed on a specific client device that is used to select the button 706 of FIG. 7. The user interface 800 includes an object 802, a description 804, and a dialogue box 806. The object 802 and the description 804 both appear dotted to indicate that they are currently capable of being edited by the specific client device. In some example embodiments, the dotted lines are only displayed on the specific client device that is being used to edit the object 802 and the description 804. In other words, the appearance of the dotted lines is a front-end only update to the user interface 800 of the specific client device. The dialogue box 806 is also a front-end only update to the user interface 800 where a user of the client device can enter an annotation to the description 804. In various example embodiments, elements in the user interface 800 does not match the server version of the elements.

Figure 9:
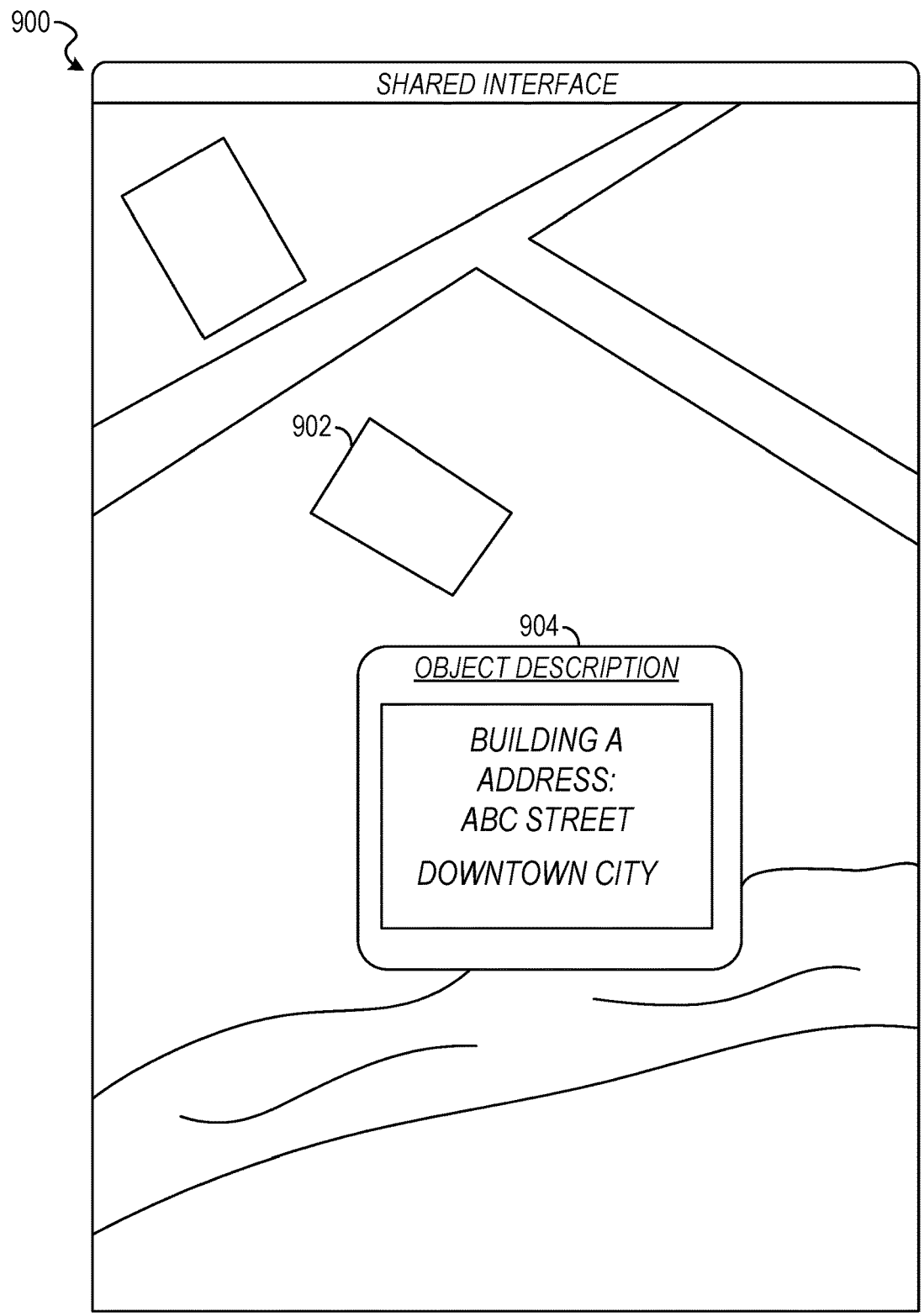
FIG. 9 is a block diagram that depicts a user interface, according to some example embodiments.

FIG. 9 is a block diagram that depicts a user interface, according to some example embodiments. The user interface 900 is displayed on each of a plurality of devices. Moreover, the user interface 900 includes an object 902 and a description 904. The user interface 900, in some example embodiments, displays one or more system-wide updates of the object 902 and of the description 904. As shown in FIG. 9, the description 904 includes the edits that were made by the user in the dialogue box 806 of FIG. 8. As also shown in FIG. 9, the system-wide updates include movement of the object 902 and the description 904 and an increase in the font size of the information in the description 904. These system-wide updates are displayed by the display module 250 in each of the plurality of devices viewing the user interface. In various example embodiments, elements in the user interface 900 do not matches the server version of the elements.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 10:
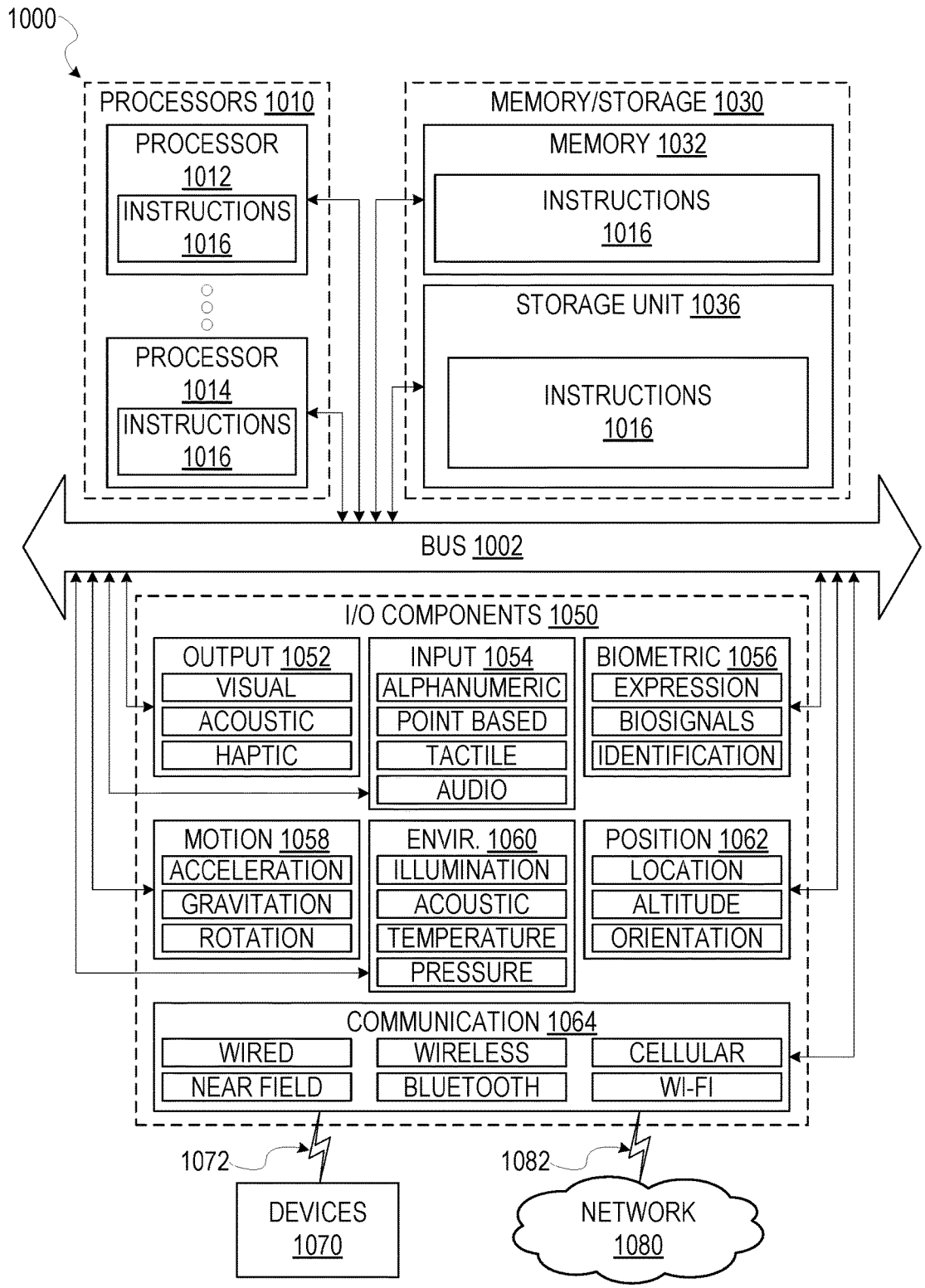
FIG. 10 illustrates a diagrammatic representation of a machine in the form of a computer system within which a set of instructions may be executed for causing the machine to perform any one or more of the methodologies discussed herein, according to an example embodiment.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example the instructions may cause the machine to execute the flow diagrams of FIGS. 3-5. Additionally, or alternatively, the instructions may implement the modules described in of FIG. 2. The instructions transform the general, non-programmed machine into a particular machine specially configured to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1012 and processor 1014 that may execute instructions 1016. The term "processor" is intended to include multi-core processor that may comprise two or more independent processors (sometimes referred to as "cores") that may execute instructions contemporaneously. Although FIG. 10 shows multiple processors, the machine 1000 may include a single processor with a single core, a single processor with multiple cores (e.g., a multi-core process), multiple processors with a single core, multiple processors with multiples cores, or any combination thereof.

The memory/storage 1030 may include a memory 1032, such as a main memory, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 may also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of processors 1010 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1016. The term "machine-readable medium" shall also be taken to include any medium, or combination of multiple media, that is capable of storing instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062 among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1062 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via coupling 1082 and coupling 1072 respectively. For example, the communication components 1064 may include a network interface component or other suitable device to interface with the network 1080. In further examples, communication components 1064 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., a peripheral device coupled via a Universal Serial Bus (USB)).

Moreover, the communication components 1064 may detect identifiers or include components operable to detect identifiers. For example, the communication components 1064 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 1080 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network and the coupling 1082 may be a Code Division Multiple Access (CDMA) connection, a Global System for Mobile communications (GSM) connection, or other type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to devices 1070. The term "transmission medium" shall be taken to include any intangible medium that is capable of storing, encoding, or carrying instructions 1016 for execution by the machine 1000, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    generating, by a client device, a first group of instructions for causing a first modification of an element depicted in a user interface, the user interface being accessible for modification by at least a second client device;
    executing a front-end update based on the first group of instructions, the front-end update causing the first modification on a local version of the user interface associated with the client device;
    transmitting the first group of instructions to a server that maintains a listing of modifications to the user interface that are received from at least the client device and the second client device;
    receiving, from the server, a system-wide update including a second group of instructions for causing a second modification of the element in the user interface, the second modification being different than the first modification, the second group of instructions having been generated based on a state of the element prior to the first modification and having been received by the server from the second client device prior to the server having received the first group of instructions;
    determining, using one or more processors of the client device, that the first group of instructions conflict with the second group of instructions;
    in response to determining that the first group of instructions conflicts with the second group of instructions, transforming the first group of instructions based on the second group of instructions, yielding a transformed first group of instructions;
    executing a front-end update based on the transformed first group of instructions; and
    transmitting, to the server, the transformed first group of instructions, the server sending a second system-wide update to at least the second client device, the second system-wide update including the transformed first group of instructions.

2. The method of claim 1, wherein the second group of instructions are received after the execution of the front-end update based on the first group of instruction.

3. The method of claim 1, wherein the second group of instructions are generated by the second device and transmitted to the server by the second client device after the second client device executed a front-end update based on the second group of instructions causing the second modification on a local version of the user interface associated with the second client device.

4. The method of claim 1, further comprising:
    revoking execution of the front-end update based on the first group of instructions; and
    executing a front-end update based on the second group of instructions.

5. The method of claim 1, further comprising:
generating a third group of instructions for causing a modification of a second element depicted in the user interface, wherein the third group of instructions comprise one or more front-end only instructions;
executing a front-end only update based on the third group of instructions;
generating a filtered group of instructions based on the third group of instructions, wherein the filtered group of instructions excludes the one or more front-end only instructions; and
transmitting the filtered group of instructions to the server, the server sending a third system-wide update to at least the second client device, the third system-wide update including the filtered group of instructions.

6. The method of claim 1, wherein the user interface displays at least one of:
a spreadsheet;
a geographical area;
or a word processing document.

7. The method of claim 1, wherein the first modification includes moving the element from a first position to a second position.

8. A client device comprising:
one or more computer processors; and
one or more computer-readable mediums storing instructions that, when executed by the one or more computer processors, cause the client device to perform operations comprising:
generating a first group of instructions for causing a first modification of an element depicted in a user interface, the user interface being accessible for modification by at least a second client device;
executing a front-end update based on the first group of instructions, the front-end update causing the first modification on a local version of the user interface associated with the client device;
transmitting the first group of instructions to a server that maintains a listing of modifications to the user interface that are received from at least the client device and the second client device;
receiving, from the server, a system-wide update including a second group of instructions for causing a second modification of the element in the user interface, the second modification being different than the first modification, the second group of instructions having been generated based on a state of the element prior to the first modification and having been received by the server from the second client device prior to the server having received the first group of instructions;
determining that the first group of instructions conflict with the second group of instructions;
in response to determining that the first group of instructions conflicts with the second group of instructions, transforming the first group of instructions based on the second group of instructions, yielding a transformed first group of instructions;
executing a front-end update based on the transformed first group of instructions; and
transmitting, to the server, the transformed first group of instructions, the server sending a second system-wide update to at least the second client device, the second system-wide update including the transformed first group of instructions.

9. The client device of claim 8, wherein the second group of instructions are received after the execution of the front-end update based on the first group of instruction.

10. The client device of claim 8, wherein the second group of instructions are generated by the second device and transmitted to the server by the second client device after the second client device executed a front-end update based on the second group of instructions causing the second modification on a local version of the user interface associated with the second client device.

11. The client device of claim 8, the operations further comprising:
revoking execution of the front-end update based on the first group of instructions; and
executing a front-end update based on the second group of instructions.

12. The client device of claim 8, the operations further comprising:
generating a third group of instructions for causing a modification of a second element depicted in the user interface, wherein the third group of instructions comprise one or more front-end only instructions;
executing a front-end only update based on the third group of instructions;
generating a filtered group of instructions based on the third group of instructions, wherein the filtered group of instructions excludes the one or more front-end only instructions; and
transmitting the filtered group of instructions to the server, the server sending a third system-wide update to at least the second client device, the third system-wide update including the filtered group of instructions.

13. The client device of claim 8, wherein the user interface displays at least one of:
a spreadsheet;
a geographical area;
or a word processing document.

14. The client device of claim 8, wherein the first modification includes moving the element from a first position to a second position.

15. A non-transitory computer-readable medium storing instructions that, when executed by one or more computer processors of a client device, cause the client device to perform operations comprising:
generating a first group of instructions for causing a first modification of an element depicted in a user interface, the user interface being accessible for modification by at least a second client device;
executing a front-end update based on the first group of instructions, the front-end update causing the first modification on a local version of the user interface associated with the client device;
transmitting the first group of instructions to a server that maintains a listing of modifications to the user interface that are received from at least the client device and the second client device;
receiving, from the server, a system-wide update including a second group of instructions for causing a second modification of the element in the user interface, the second modification being different than the first modification, the second group of instructions having been generated based on a state of the element prior to the first modification and having been received by the server from the second client device prior to the server having received the first group of instructions;
determining that the first group of instructions conflict with the second group of instructions;

in response to determining that the first group of instructions conflicts with the second group of instructions, transforming the first group of instructions based on the second group of instructions, yielding a transformed first group of instructions;

executing a front-end update based on the transformed first group of instructions; and transmitting, to the server, the transformed first group of instructions, the server sending a second system-wide update to at least the second client device, the second system-wide update including the transformed first group of instructions.

16. The non-transitory computer-readable medium of claim 15, wherein the second group of instructions are received after the execution of the front-end update based on the first group of instruction.

17. The non-transitory computer-readable medium of claim 15, wherein the second group of instructions are generated by the second device and transmitted to the server by the second client device after the second client device executed a front-end update based on the second group of instructions causing the second modification on a local version of the user interface associated with the second client device.

18. The non-transitory computer-readable medium of claim 15, the operations further comprising:

revoking execution of the front-end update based on the first group of instructions; and executing a front-end update based on the second group of instructions.

19. The non-transitory computer-readable medium of claim 15, the operations further comprising:

generating a third group of instructions for causing a modification of a second element depicted in the user interface, wherein the third group of instructions comprise one or more front-end only instructions;

executing a front-end only update based on the third group of instructions;

generating a filtered group of instructions based on the third group of instructions, wherein the filtered group of instructions excludes the one or more front-end only instructions; and transmitting the filtered group of instructions to the server, the server sending a third system-wide update to at least the second client device, the third system-wide update including the filtered group of instructions.

20. The non-transitory computer-readable medium of claim 15, wherein the first modification includes moving the element from a first position to a second position.

* * * * *